(12) United States Patent
Su et al.

(10) Patent No.: US 9,798,169 B2
(45) Date of Patent: Oct. 24, 2017

(54) LIQUID CRYSTAL DISPLAY WITH SWITCHABLE VIEWING ANGLE AND METHOD OF VIEWING ANGLE CONTROL

(71) Applicant: Infovision Optoelectronics (Kunshan) Co., Ltd., Kunshan, Jiangsu Province (CN)

(72) Inventors: Zifang Su, Kunshan (CN); Limei Jiang, Kunshan (CN)

(73) Assignee: INFOVISION OPTOELECTRONICS (KUNSHAN) CO., LTD., Kunshan, Jiangsu Province (CN)

( * ) Notice: Subject to any disclaimer, the term of this patent is extended or adjusted under 35 U.S.C. 154(b) by 0 days.

(21) Appl. No.: 15/216,683

(22) Filed: Jul. 21, 2016

(65) Prior Publication Data

US 2017/0059898 A1    Mar. 2, 2017

(30) Foreign Application Priority Data

Aug. 26, 2015 (CN) .......................... 2015 1 0530921

(51) Int. Cl.
G02F 1/1343 (2006.01)
G02F 1/13 (2006.01)
G02F 1/1337 (2006.01)
G02F 1/137 (2006.01)

(52) U.S. Cl.
CPC ............ *G02F 1/1323* (2013.01); *G02F 1/137* (2013.01); *G02F 1/1337* (2013.01); *G02F 1/133784* (2013.01); *G02F 1/134309* (2013.01); *G02F 2001/13712* (2013.01); *G02F 2001/133738* (2013.01); *G02F 2001/133746* (2013.01);
(Continued)

(58) Field of Classification Search
CPC ................. G02F 1/1323; G02F 1/1337; G02F 1/133784; G02F 1/134309; G02F 1/137
See application file for complete search history.

(56) References Cited

U.S. PATENT DOCUMENTS

2002/0113929 A1*  8/2002  Yamazaki ......... G02F 1/134363
                                                              349/123
2014/0002761 A1    1/2014  Heo et al.
(Continued)

FOREIGN PATENT DOCUMENTS

CN        1991466 A       7/2007
CN      101535884 A       9/2009
(Continued)

*Primary Examiner* — James Dudek
(74) *Attorney, Agent, or Firm* — Cheng-Ju Chiang

(57) ABSTRACT

An LCD with switchable viewing angle includes a first substrate, second substrate, and a liquid crystal layer. The first substrate is provided with a first electrode and a first alignment film. The second substrate is provided with a second electrode, a third electrode and a second alignment film. The liquid crystal molecules adjacent to the first alignment film are tilted at a first pretilt angle. The liquid crystal molecules adjacent to the second alignment film are tilted at a second pretilt angle. The second pretilt angle is in the range of 30° to 50°, and the first pretilt angle is in the range of 0° to 5°. When no bias voltage is applied to the first electrode, the LCD is displayed with a narrow viewing angle; and when a bias voltage is applied to the first electrode, the LCD is displayed with a wide viewing angle.

14 Claims, 29 Drawing Sheets

(52) U.S. Cl.
CPC ............ *G02F 2001/133749* (2013.01); *G02F 2201/121* (2013.01); *G02F 2201/123* (2013.01)

(56) References Cited

U.S. PATENT DOCUMENTS

| | | | |
|---|---|---|---|
| 2014/0104522 A1* | 4/2014 | Onda | ................ G02F 1/134363 349/33 |
| 2015/0153619 A1* | 6/2015 | Murata | ................ G02F 1/1337 349/123 |
| 2017/0139290 A1* | 5/2017 | Iwata | ................ G02F 1/134363 |

FOREIGN PATENT DOCUMENTS

| | | |
|---|---|---|
| CN | 104155808 A | 11/2014 |
| CN | 104246588 A | 12/2014 |
| CN | 104865757 A | 8/2015 |
| CN | 105223743 A | 1/2016 |
| JP | H11-30783 A | 2/1999 |
| KR | 10-2009-0128927 A | 12/2009 |
| TW | 201329526 A | 7/2013 |
| TW | 201329526 A1 | 7/2013 |
| WO | 2013/176159 A1 | 11/2013 |

* cited by examiner

LIQUID CRYSTAL DISPLAY WITH SWITCHABLE VIEWING ANGLE AND METHOD OF VIEWING ANGLE CONTROL

CROSS-REFERENCE TO RELATED APPLICATION

The present application is based on and claims priority of Chinese patent application No. 201510530921.3, filed on Aug. 26, 2015. The entire disclosure of the above-identified application is hereby incorporated by reference herein and made a part of this specification.

TECHNICAL FIELD

The present application relates to liquid crystal display technology, and more particularly to a liquid crystal display with switchable viewing angle, and a method of controlling the viewing angle of a liquid crystal display.

BACKGROUND

Liquid crystal display (LCD) has many advantages, such as, light weight, energy saving, no radiation, and accordingly has gradually replaced traditional cathode ray tube (CRT) display. LCDs are widely used in high-definition digital televisions, desktop computers, personal digital assistants (PDA), notebook computers, mobile phones, digital cameras, and other electronic devices.

Wide viewing angle is the mainstream development of the LCD. Presently, portable electronic devices such as notebook computers, personal digital assistants, tablet PCs, mobile phones are adopted with wide viewing angle technology, so that users can see the display images on the LCD without distortion when viewed from different viewing angles. However, when using the portable electronic device in public places, the wide viewing angle design of conventional LCD cannot effectively protect the privacy of the user, and the images displayed on the LCD can be easily viewed by a bystander in a squint direction. Therefore, in addition to the needs for a wide viewing angle, LCDs capable of being adjusted to a narrow viewing angle are thus developed in order to protect modern people's needs of privacy in public places.

Currently, there are mainly two ways to switch between a wide viewing angle and a narrow viewing angle in an LCD. One way is to use a louver shielding film to cover the screen so as to narrow the angle of view in the need for protecting privacy. However, this way needs preparation of an additional louver covering film, causing great inconvenience to the user. One louver covering film can only achieve a fixed viewing angle. Once a louver covering film is attached to the screen, then the viewing angle of the screen is fixed and cannot change according to requirement of the user. The other way is to provide a dual light source backlight system in the LCD to adjust the viewing angle. The dual light source backlight system consists of two layers of laminated light guide plates in combination with an anti-prism lens, the top light guide plate (LGP-T) combined with the anti-prism lens is used to change the direction of lights and restrict the lights in a relatively narrow range to obtain a narrow viewing angle in the LCD, while the bottom light guide plate (LGP-B) combined with the function of the anti-prism lens is used to obtain a wide viewing angle in the LCD. However, the dual light source backlight system will cause the thickness and the cost of the LCD to increase remarkably, which is not in line with the development trend of light weight, compactness and slimness of the LCD.

SUMMARY

The present application provides an LCD with switchable viewing angle, the LCD can be switched between a narrow viewing angle and a wide viewing angle when required, without the need to use a louver shielding film or to provide a dual light source backlight system in the LCD, and without increasing the thickness and the cost of the LCD.

In one aspect, an LCD with switchable viewing angle is provided. The LCD includes a first substrate, a second substrate, and a liquid crystal layer disposed between the first substrate and the second substrate. The first substrate is provided with a first electrode, a first alignment film and a first polarizer thereon. The second substrate is provided with a second electrode, a third electrode, a second alignment film and a second polarizer thereon, wherein one of the second electrode and the third electrode is a common electrode, and the other one of the second electrode and the third electrode is a pixel electrode. Liquid crystal molecules of the liquid crystal layer are negative liquid crystal molecules. The liquid crystal molecules adjacent to the first alignment film are tilted at a first pretilt angle. The liquid crystal molecules adjacent to the second alignment film are tilted at a second pretilt angle. The second pretilt angle is in the range of 30° to 50°, and the first pretilt angle is in the range of 0° to 5°.

By applying a bias voltage to the first electrode or not, the viewing angle of the LCD is controlled. When no bias voltage is applied to the first electrode, light passing the liquid crystal molecules are not matched with the light transmission axis of the first polarizer and the second polarizer, a light leakage in dark state is resulted and the contrast of displayed images of the LCD is accordingly decreased to achieve a narrow viewing angle display mode. When a bias voltage is applied to the first electrode, a vertical electric field is generated between the first substrate and the second substrate to cause the liquid crystal molecules of the liquid crystal layer to rotate. As the liquid crystal molecules rotate, a tilt angle of the liquid crystal molecules adjacent to the second alignment film is reduced from the initial second pretilt angle. Particularly, when a relatively large bias voltage is applied to the first electrode, the tilt angle of the liquid crystal molecules adjacent to the second alignment film may reduce from the initial second pretilt angle to nearly zero in which the liquid crystal molecules adjacent to the second alignment film are substantially parallel to the second substrate. As a result, the light leakage phenomenon in dark state is relieved and the contrast of displayed images of the LCD is increased to achieve a wide viewing angle display mode.

In another aspect, a method of controlling a viewing angle of the LCD is provided. The method includes the steps: when the LCD is required to display with a narrow viewing angle, applying no bias voltage to the first electrode; and when the LCD is required to display with a wide viewing angle, applying a bias voltage to the first electrode. In the embodiments, the bias voltage applied to the first electrode may be in the range of −2V to −6V.

Therefore, the viewing angle of the LCD can be easily switched between a narrow viewing angle and a wide viewing angle by simply applying a bias voltage to the first electrode of the first substrate. It is not required to use a louver shielding film or to provide a dual light source backlight system in the LCD, without increasing the thickness and the cost of the LCD and having the advantages of easy operation and good flexibility.

Other novel features and advantages will become more apparent from the following detailed description when taken in conjunction with the accompanying drawings.

DETAILED DESCRIPTION OF PREFERRED EMBODIMENTS

Exemplary embodiments of the present application are described in detail with reference to the accompanying drawings, but the present application is not limited to the following embodiments.

Figure 1:
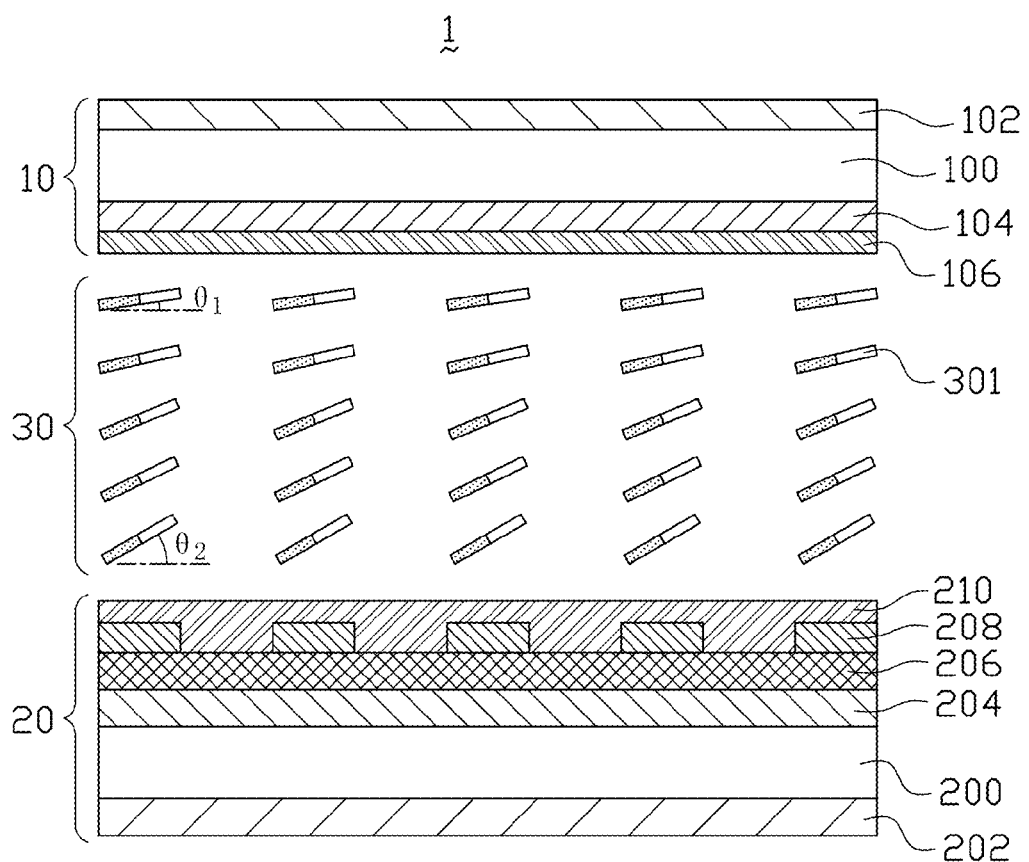
FIG. 1 schematically shows a sectional view of an LCD according to an embodiment of the present application.

FIG. 1 schematically shows a sectional view of an LCD according to an embodiment of the present application. In order for clarity, only a portion of the LCD is shown. Referring to FIG. 1, the present application provides a liquid crystal display (LCD) 1 with switchable viewing angle. In the embodiment, the LCD 1 includes a first substrate 10, a second substrate 20, and a liquid crystal layer 30 disposed and sealed between the first substrate 10 and the second substrate 20.

Generally, when a user views an LCD from different viewing angles, the brightness of image may reduce as the viewing angle increases. For traditional twisted nematic (TN) type LCD, common electrode and pixel electrode are separately formed on two different substrates, the liquid crystal molecules rotate in a plane orthogonal to the substrates. However, a viewing angle of TN type LCD is narrow as the orientations of liquid crystal molecules adjacent to the surfaces of the two substrates are orthogonal with each other. In order to realize wide viewing angle, both in-plane switch (IPS) type LCD employing a horizontal electric field and fringe field switching (FFS) type LCD employing a fringe electric field have been developed. For IPS type LCD or FFS type LCD, common electrode and pixel electrode are both formed on the same substrate (e.g., the array substrate), the liquid crystal molecules rotate in a plane in parallel to the substrate to obtain improved viewing angle.

The LCD 1 is suitable for being applied in an FFS type LCD or an IPS type LCD in which the liquid crystal molecules rotate in a plane in parallel to the substrate when an electric field generated between the pixel electrode and the common electrode is provided to the liquid crystal molecules for display. In this embodiment, the LCD 1 is shown as an FFS type LCD by an example.

Specifically, the first substrate 10 may be a color filter substrate. The first substrate 10 may include a first transparent base 100, a first polarizer 102, a first electrode 104, and a first alignment film 106. The first polarizer 102 is arranged on an outer surface of the first transparent base 100 far away from the liquid crystal layer 30. The first polarizer 102 has a first light transmission axis (not shown). The first electrode 104 is arranged on an inner surface of the first transparent base 100 facing the liquid crystal layer 30. The first alignment film 106 is arranged on an inner surface of the first electrode 104 facing the liquid crystal layer 30. The first electrode 104 is transparent, and may be made of Indium Tin Oxide (ITO), Indium Zinc Oxide (IZO) or the like. The first electrode 104 may wholly cover the first transparent base 100, that is, the first electrode 104 is a surface electrode without being patterned.

The second substrate 20 may be a thin film transistor (TFT) array substrate. The second substrate 20 may include a second transparent base 200, a second polarizer 202, a second electrode 204, an insulating layer 206, a third electrode 208, and a second alignment film 210. The second polarizer 202 is arranged on an outer surface of the second transparent base 200 far away from the liquid crystal layer 30. The second polarizer 202 has a second light transmission axis (not shown). The first light transmission axis of the first polarizer 102 and the second light transmission axis of the second polarizer 202 are perpendicular to each other. The second electrode 204 is arranged on an inner surface of the second transparent base 200 facing the liquid crystal layer 30. The insulating layer 206 is arranged on an inner surface of the second electrode 204 facing the liquid crystal layer 30. The third electrode 208 is arranged on an inner surface of the insulating layer 206 facing the liquid crystal layer 30. The second alignment film 210 is arranged on an inner surface of the third electrode 208 facing the liquid crystal layer 30.

The second electrode 204 and the third electrode 208 are transparent, and may be made of Indium Tin Oxide (ITO), Indium Zinc Oxide (IZO) or the like. In the embodiment, the second electrode 204 may wholly cover the second transparent base 200, that is, the second electrode 204 is a surface electrode without being patterned. The third electrode 208 is patterned to form a plurality of electrode stripes (not labeled) which are arranged in parallel to each other. In other embodiments, similar to the third electrode 208, the second electrode 204 may also be patterned to form a plurality of electrode stripes which are arranged in parallel to each other.

In one embodiment, the second electrode 204 may be a pixel electrode, which is formed in each pixel of the LCD 1, the third electrode 208 may be a common electrode for inputting a common voltage (i.e., Vcom) from a driver IC (not shown).

In another embodiment, the second electrode 204 may be a common electrode for inputting a common voltage (i.e., Vcom) from a driver IC (not shown), the third electrode 208 may a pixel electrode, which is formed in each pixel of the LCD 1.

The liquid crystal layer 30 is provided with a plurality of liquid crystal molecules 301 which are disposed between the first alignment film 106 and the second alignment film 210. The first alignment film 106 and the second alignment film 210 can be made of polyimide (PI). The first alignment film 106 and the second alignment film 210 are used to align the liquid crystal molecules 301, so that the liquid crystal molecules 301 are oriented in predetermined directions. For example, each of the alignment films 106, 210 may be subjected to a rubbing treatment according to publicly known rubbing process. After the rubbing process, the first alignment film 106 is rubbed to have a first rubbing direction (not shown), the second alignment film 210 is rubbed to have a second rubbing direction (not shown). The liquid crystal molecules 301 adjacent to the first alignment film 106 are arranged and oriented along the first rubbing direction of the first alignment film 106. The liquid crystal molecules 301 adjacent to the second alignment film 210 are arranged and oriented along the second rubbing direction of the second alignment film 210.

Further, as shown in FIG. 1, the liquid crystal molecules 301 adjacent to the first alignment film 106 are tilted at a first pretilt angle $\theta_1$. That is, an acute angle $\theta_1$ is formed between a horizontal direction and the long axis of the liquid crystal molecules 301 adjacent to the first alignment film 106, so that the liquid crystal molecules 301 adjacent to the first alignment film 106 are arranged along the first rubbing direction of the first alignment film 106 at a tilted state with the first pretilt angle $\theta_1$. The liquid crystal molecules 301 adjacent to the second alignment film 210 are tilted at a second pretilt angle $\theta_2$. That is, an acute angle $\theta_2$ is formed between the horizontal direction and the long axis of the liquid crystal molecules 301 adjacent to the second alignment film 210, so that the liquid crystal molecules 301 adjacent to the second alignment film 210 are arranged along the second rubbing direction of the second alignment film 210 at a tilted state with the second pretilt angle $\theta_2$.

As shown in FIG. 1, all of the liquid crystal molecules 301 in the liquid crystal layer 30 are tilted in a counter-clockwise direction, wherein the liquid crystal molecules 301 adjacent to the second alignment film 210 are tilted at a greater angle compared with the liquid crystal molecules 301 adjacent to the first alignment film 106. That is, the second pretilt angle $\theta_2$ is greater than the first pretilt angle $\theta_1$. Preferably, the second pretilt angle $\theta_2$ is in the range of 30°~50°, i.e., 30°≤$\theta_2$≤50°. For example, in different embodiments, the second pretilt angle $\theta_2$ can be at 30°, 40°, 50°, etc. The first pretilt angle $\theta_1$ is preferably in the range of 0°~5°, i.e., 0°≤$\theta_1$≤5°. For example, in different embodiments, the first pretilt angle $\theta_1$ can be at 0°, 2°, 5°, etc. Since the first pretilt angle $\theta_1$ is very small, the liquid crystal molecules 301 adjacent to the first alignment film 106 can also be deemed as being substantially parallel to the first alignment film 106, that is, the long axis of the liquid crystal molecules 301 adjacent to the first alignment film 106 is substantially parallel to the surface of the first alignment film 106 since the first pretilt angle $\theta_1$ is smaller than 5°.

Liquid crystal molecules are generally divided into positive liquid crystal molecules and negative liquid crystal molecules. In the embodiment, the liquid crystal molecules 301 of the liquid crystal layer 30 are negative liquid crystal molecules. Since the negative liquid crystal molecules 301 will rotate to a direction perpendicular to an electric field, when the LCD 1 is applied with an electric field for display by a voltage difference exerted between the second electrode 204 and the third electrode 208, the negative liquid crystal molecules 301 of the liquid crystal layer 30 will rotate in a plane in parallel to the first substrate 10 and the second substrate 20, and the short axis of the negative liquid crystal molecules 301 is parallel to the electric field, so that the LCD 1 has a better light transmission.

Figure 2:
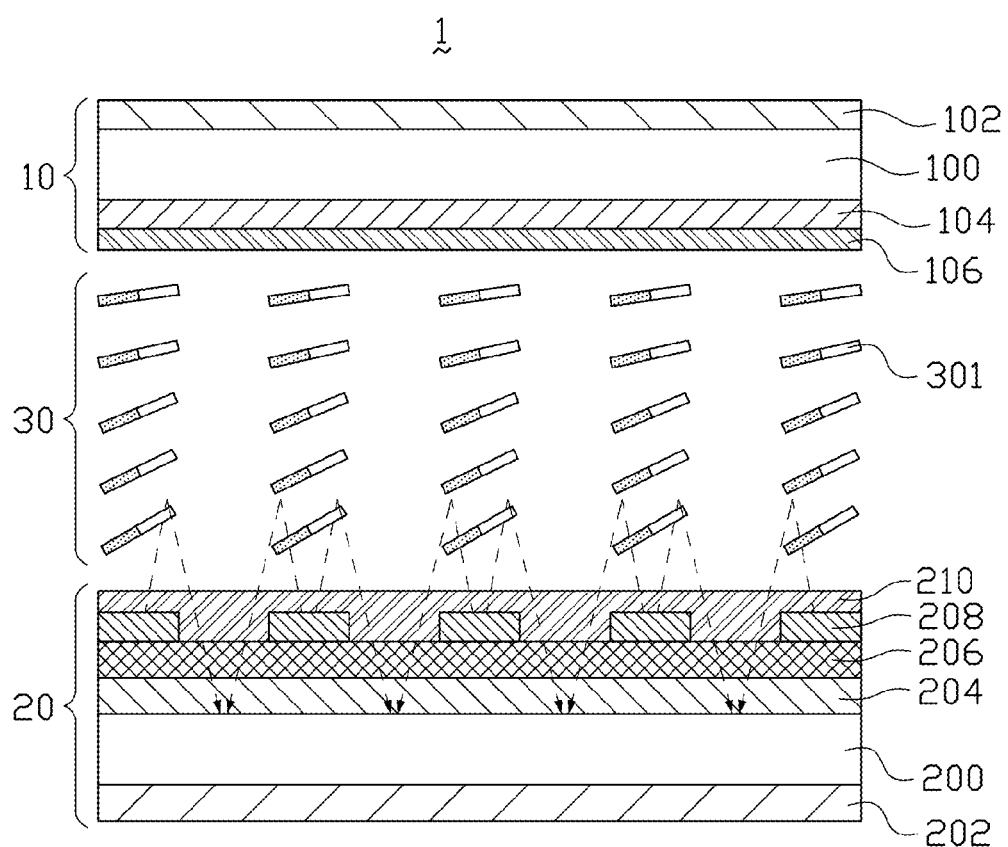
FIG. 2 schematically shows a sectional view of the LCD of FIG. 1 in a narrow viewing angle display mode.
Figure 3:
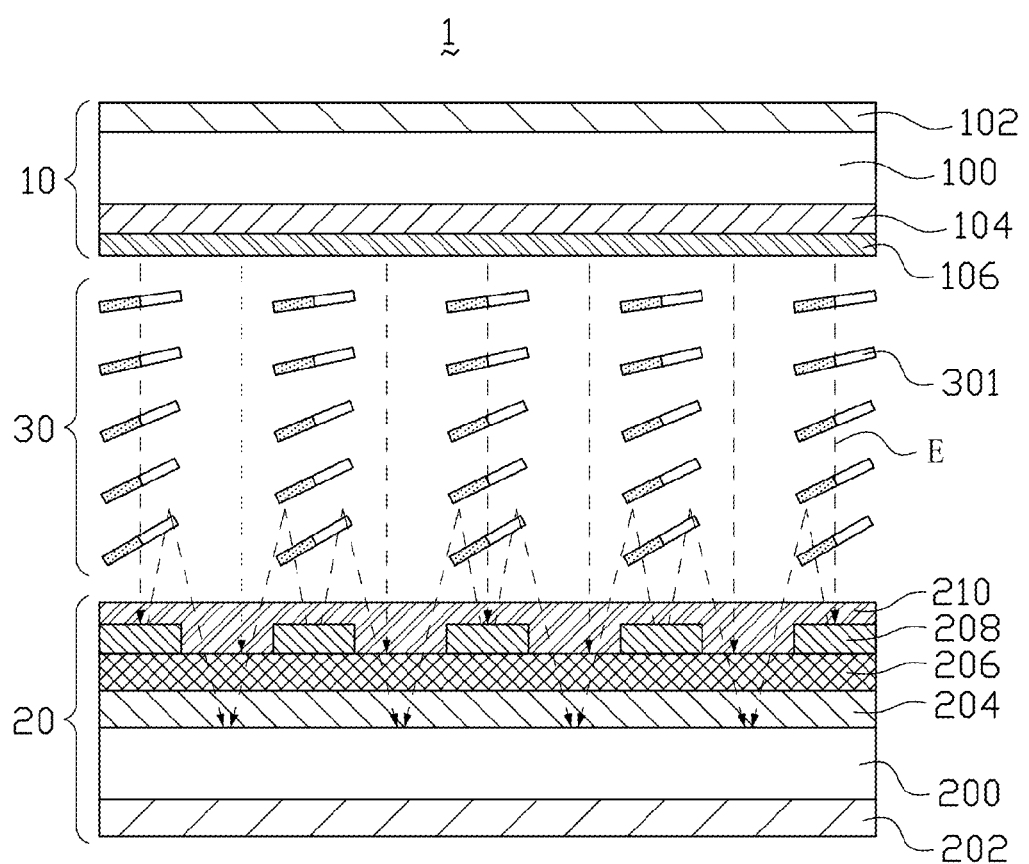
FIG. 3 schematically shows a sectional view of the LCD of FIG. 1 in a wide viewing angle display mode.

Referring to FIGS. 2-3, the LCD 1 can be switched between a narrow viewing angle and a wide viewing angle. In FIG. 2, the LCD 1 is shown for display with a narrow viewing angle. In FIG. 3, the LCD 1 is shown for display with a wide viewing angle.

As shown in FIG. 2, when no bias voltage is applied to the first electrode 104, the LCD 1 is displayed with a narrow viewing angle. In the present LCD 1, the liquid crystal molecules 301 adjacent to the first substrate 10 are tilted at the first pretilt angle $\theta_1$ relative to the first substrate 10, the liquid crystal molecules 301 adjacent to the second substrate 20 are tilted at the second pretilt angle $\theta_2$ relative to the second substrate 20, and the second pretilt angle $\theta_2$ is much greater than the first pretilt angle $\theta_1$. Therefore, when the LCD 1 is used for display, lights passing through the liquid crystal molecules 301 are no longer match with the light transmission axis of the first polarizer 102 and the second polarizer 202 due to phase delay, and a light leakage is resulted, the contrast of images displayed in the screen is accordingly decreased when the LCD 1 is viewed from a squint direction. Thus, the viewing effect of the LCD 1 is affected to achieve a narrow viewing angle display mode.

As shown in FIG. 3, when a bias voltage (e.g., −2V to −5V) is provided to the first electrode 104 and the polarity of the bias voltage provided to the first electrode 104 is contrary to the polarity of the common voltage (Vcom) provided to the common electrode, a vertical electric field E will be generated between the first substrate 10 and the second substrate 20. The negative liquid crystal molecules 301 will rotate under the action of the vertical electric field E. As the liquid crystal molecules 301 rotate under the action of the vertical electric field E, the tilt angle of the liquid crystal molecules 301 adjacent to the second substrate 20 is gradually reduced from the initial second pretilt angle $\theta_2$. When the tilt angle of the liquid crystal molecules 301 adjacent to the second substrate 20 is reduced from the initial second pretilt angle $\theta_2$ to near the first pretilt angle $\theta_1$, that is, when the liquid crystal molecules 301 adjacent to the second substrate 20 become substantially parallel with the second substrate 20 after rotation, the light leakage is relieved when the LCD 1 is viewed from a squint direction. Thus, the viewing angle of the LCD 1 is enlarged to achieve a wide viewing angle display mode.

It should be noted that, in the peripheral edge, the first substrate 10 and the second substrate 20 may be electrically connected via an electrically conductive material such as gold balls, such that the bias voltage applied to the first electrode 104 of the first substrate 10 can be inputted from a printed circuit board (PCB) which is connected to the second substrate 20.

In the following, TechWiz software is used to simulate the viewing angle and the display effect of the LCD 1.

Figure 4A:
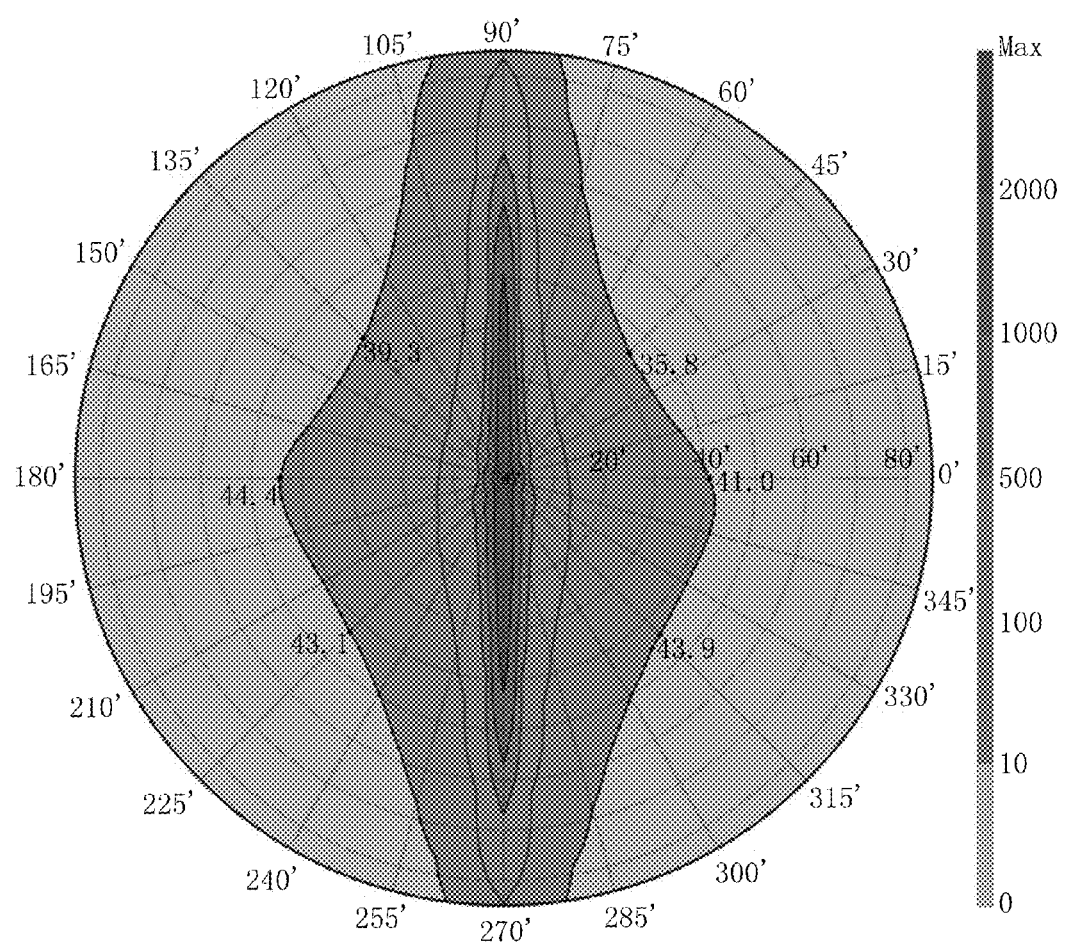
FIGS. 4a-4c show various viewing angle simulation results of the LCD of FIG. 1 when no bias voltage is applied to the first electrode.
Figure 4B:
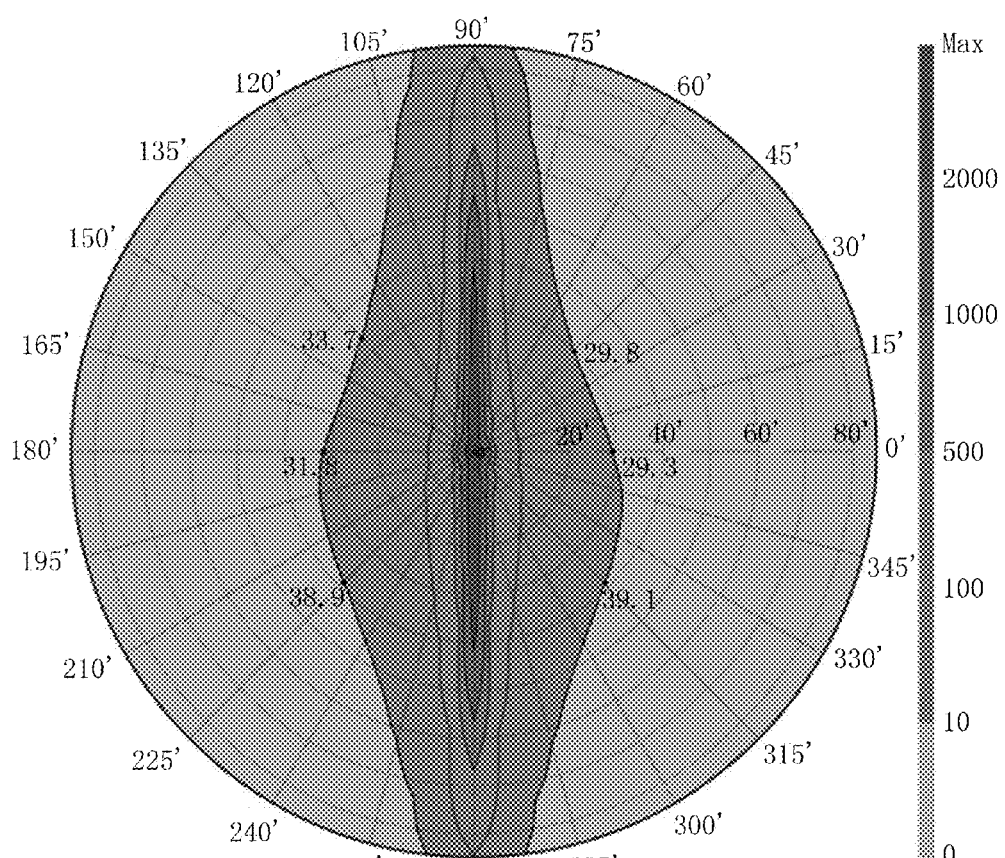
Figure 4C:
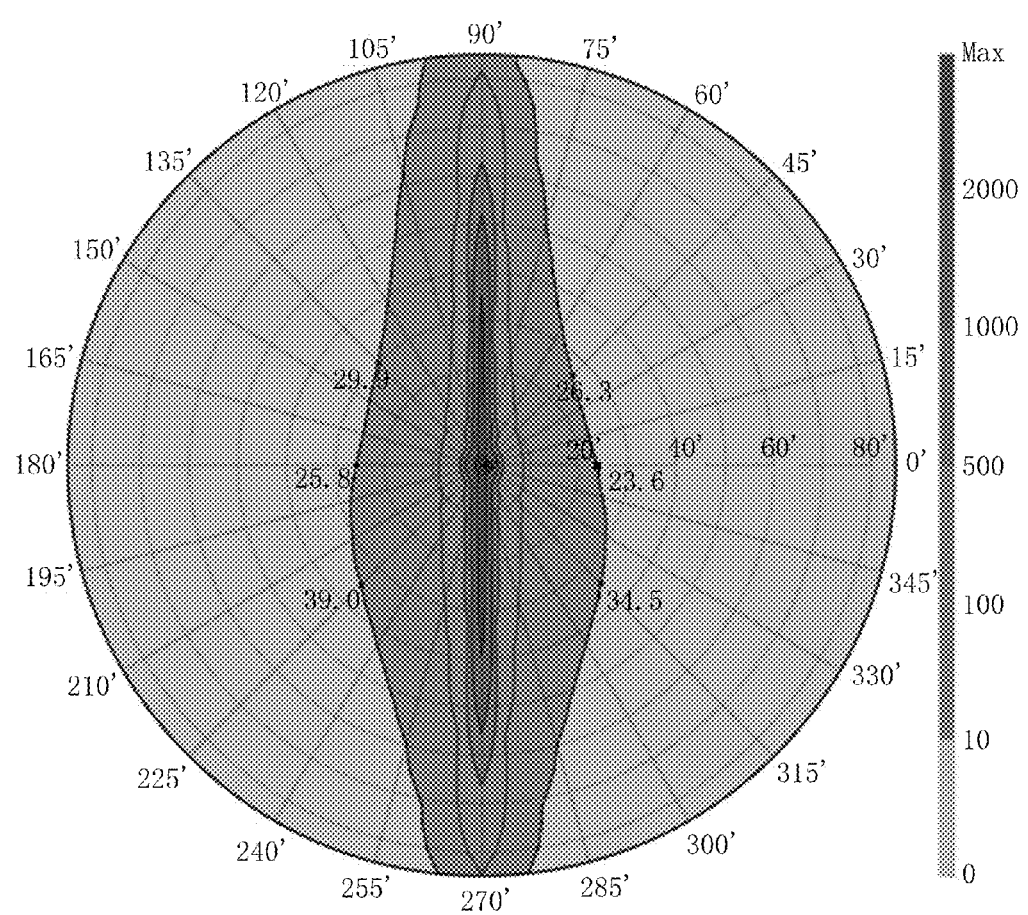

FIGS. 4a-4c show various viewing angle simulation results of the LCD 1 when no bias voltage is applied to the first electrode 104. Among them, FIG. 4a shows the viewing angle simulation result when the initial second pretilt angle $\theta_2$ is at 30°; FIG. 4b shows the viewing angle simulation result when the initial second pretilt angle $\theta_2$ is at 40°; and FIG. 4c shows the viewing angle simulation result when the initial second pretilt angle $\theta_2$ is at 50°. As can be seen from FIGS. 4a to 4c, with the increase of the initial second pretilt angle $\theta_2$, the contrast and the viewing angle in the horizontal direction of the LCD 1 are both decreased. For example, when the initial second pretilt angle $\theta_2$ is at 30°, the contrast is 3155.09, and the LCD 1 can only be effectively viewed from a viewing angle from about −44.4 degrees to about 41 degrees, as shown in FIG. 4a; when the initial second pretilt angle $\theta_2$ is at 40°, the contrast is 2923.86, and the LCD 1 can only be effectively viewed from a viewing angle from about −31.8 degrees to about 29.8 degrees, as shown in FIG. 4b; and when the initial second pretilt angle $\theta_2$ is at 50°, the contrast is 2675.7, and the LCD 1 can only be effectively viewed from a viewing angle from about −25.8 degrees to about 23.6 degrees, as shown in FIG. 4c. Therefore, from FIGS. 4a to 4c, it can be seen that the LCD 1 can achieve a narrow viewing angle and meets the requirement for protecting the privacy under the narrow viewing angle display mode when no bias voltage is applied to the first electrode 104.

Figure 5A:
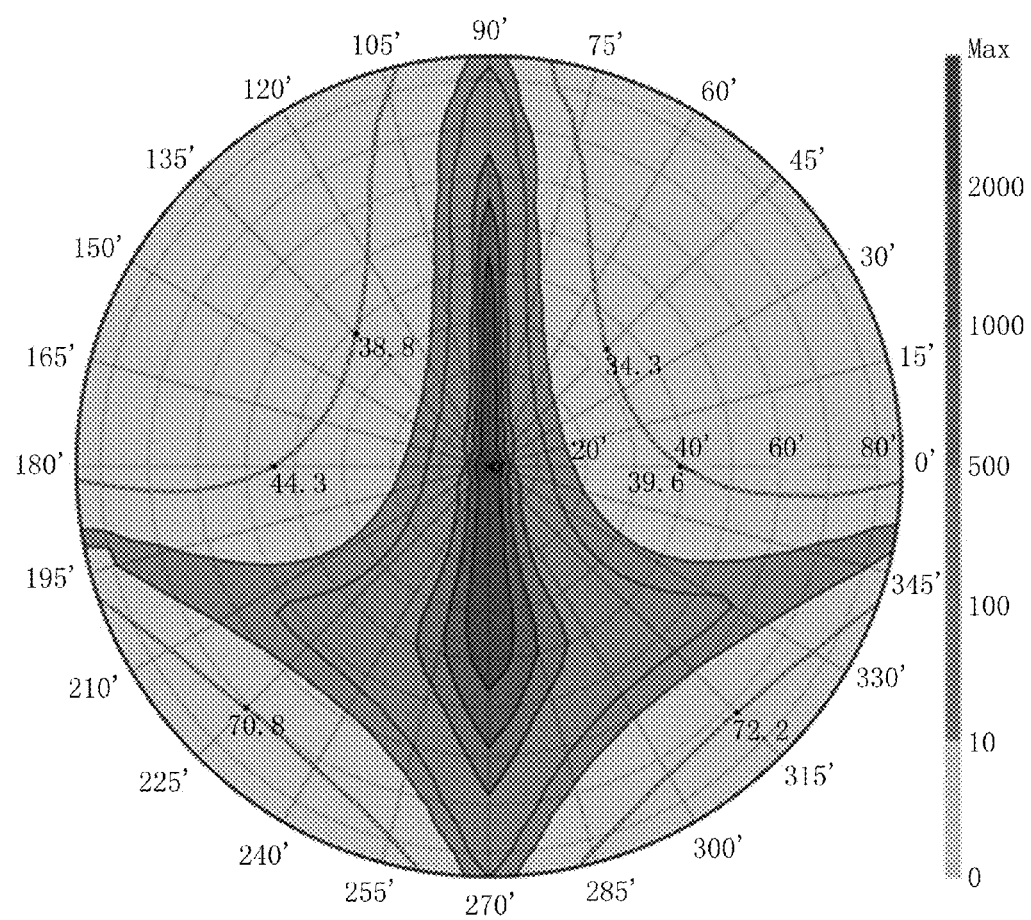
FIGS. 5a-5c show various viewing angle simulation results of a comparative LCD.
Figure 5B:
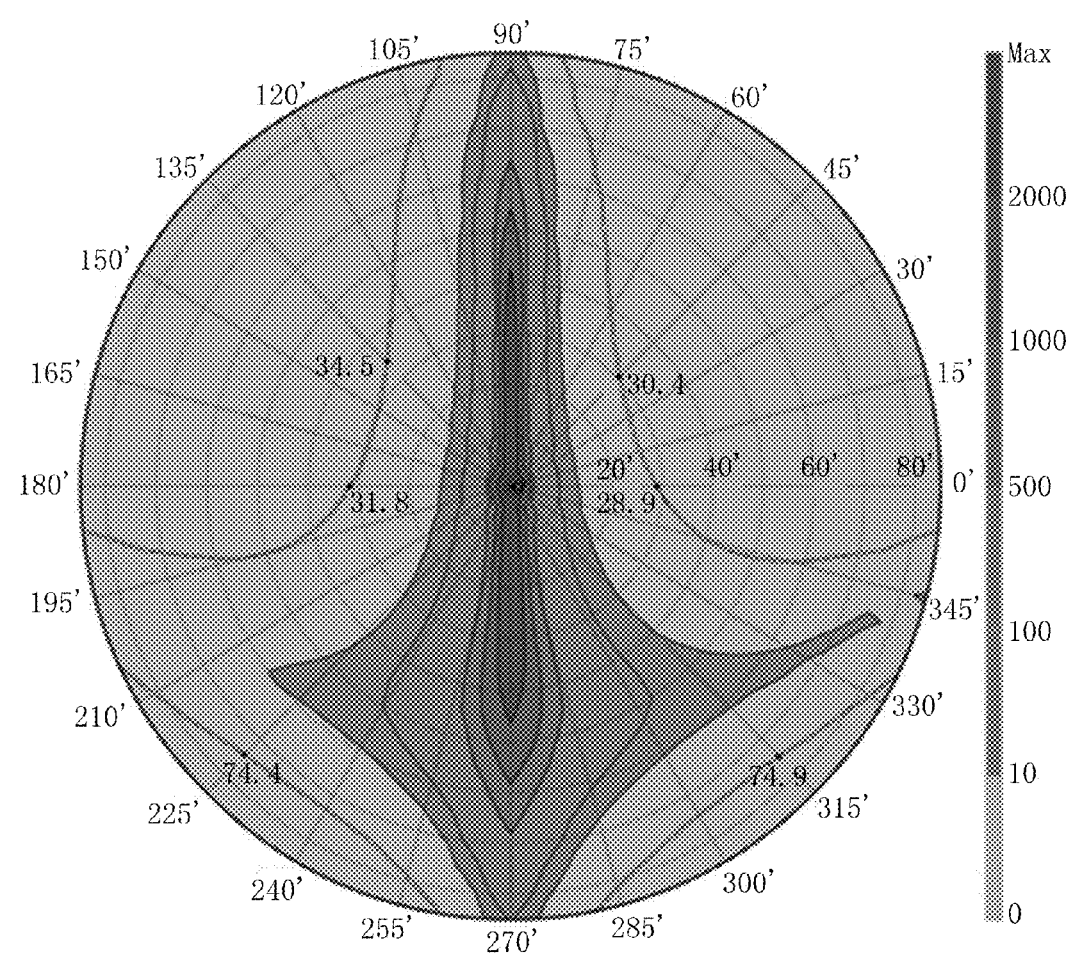
Figure 5C:
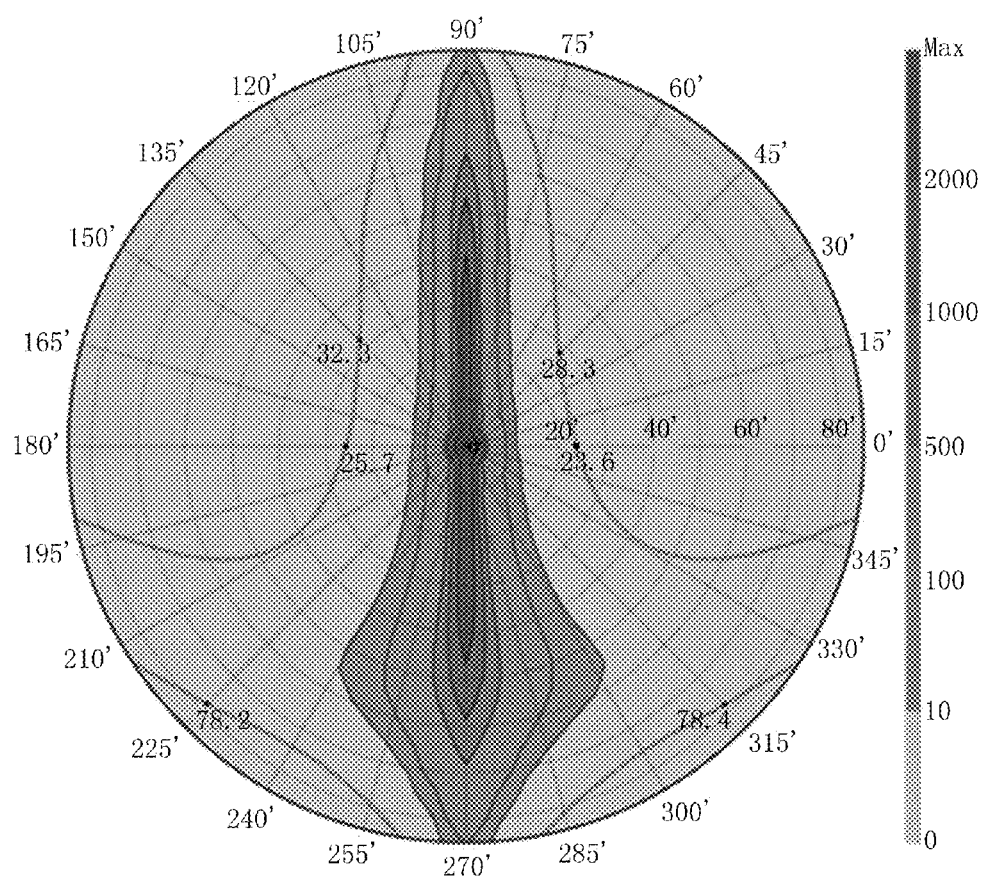

For comparison, FIGS. 5a-5c show various viewing angle simulation results of a comparative LCD in which the first pretilt angle $\theta_1$ is much greater than the second pretilt angle $\theta_2$. That is, in the comparative LCD, the liquid crystal molecules 301 adjacent to the first alignment film 106 are tilted at a much greater pretilt angle compared with the liquid crystal molecules 301 adjacent to the second alignment film 210. Among them, FIG. 5a shows the viewing angle simulation result when the first pretilt angle $\theta_1$ is at 30°; FIG. 5b shows the viewing angle simulation result when the first pretilt angle $\theta_1$ is at 40°; and FIG. 5c shows the viewing angle simulation result when the first pretilt angle $\theta_1$ is at 50°. In FIGS. 5a-5c, no bias voltage is applied to the first electrode 104. As can be seen from FIGS. 4a to 4c and FIGS. 5a to 5c, the LCD 1 can achieve a relatively better display effect under the narrow viewing angle display mode as compared with the comparative LCD.

Figure 6A:
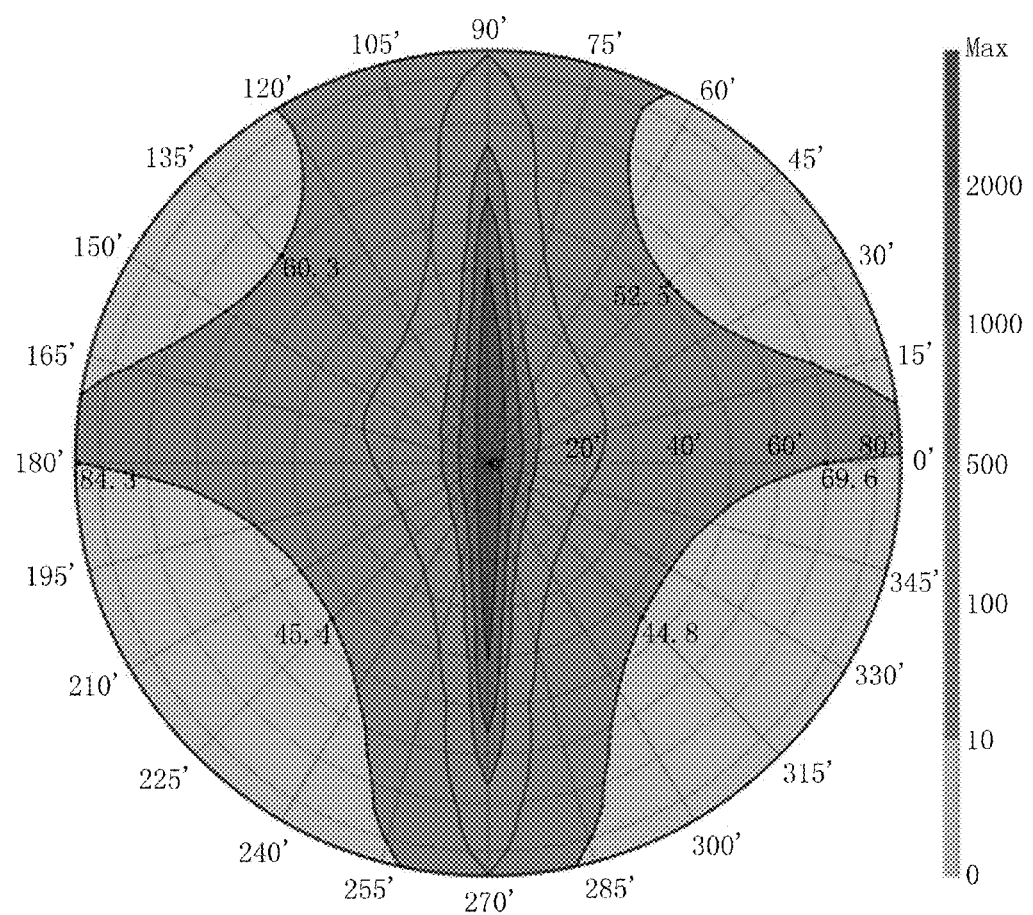
FIGS. 6a-6d show various viewing angle simulation results of the LCD of FIG. 1 when the second pretilt angle $\theta_2$ is at 30°.
Figure 6B:
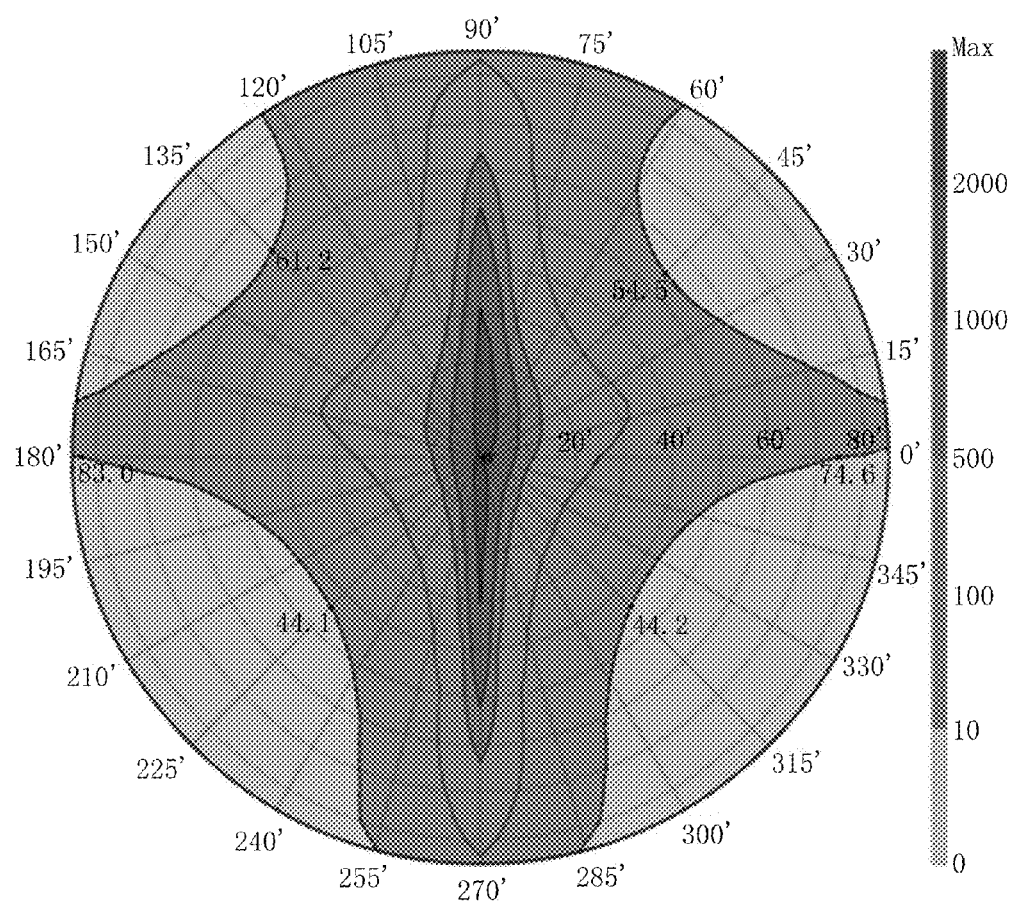
Figure 6C:
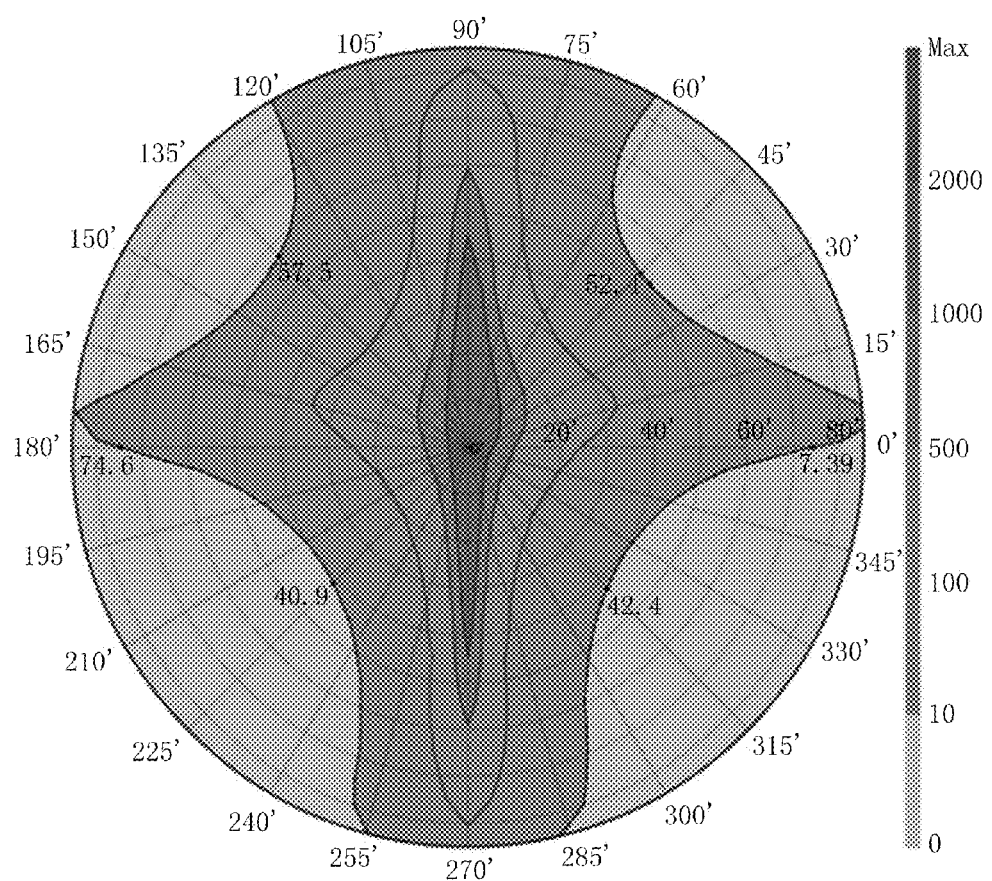
Figure 6D:
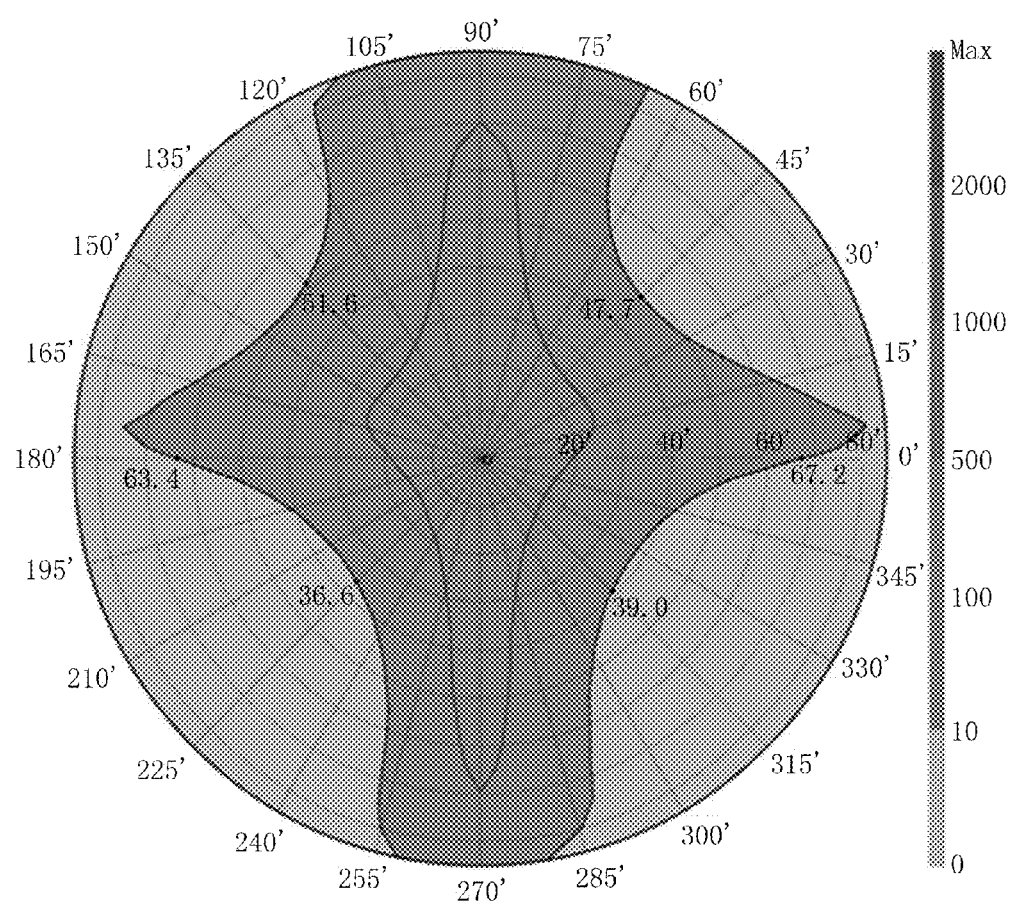

FIGS. 6a-6d show various viewing angle simulation results of the LCD 1 when the initial second pretilt angle $\theta_2$ is at 30°. In FIGS. 6a-6d, different bias voltages are applied to the first electrode 104. When the first electrode 104 is provided with different bias voltages, the effective viewing angles of the LCD 1 as viewed from the horizontal direction are different. For example, when a bias voltage of −2V is applied to the first electrode 104, the LCD 1 has an effective viewing angle from about −84.3 degrees to about 69.6 degrees in the horizontal direction, as shown in FIG. 6a; when a bias voltage of −3V is applied to the first electrode 104, the LCD 1 has an effective viewing angle from about −83 degrees to about 74.6 degrees in the horizontal direction, as shown in FIG. 6b; when a bias voltage of −4V is applied to the first electrode 104, the LCD 1 has an effective viewing angle from about −74.6 degrees to about 73.9 degrees in the horizontal direction, as shown in FIG. 6c; and when a bias voltage of −5V is applied to the first electrode 104, LCD 1 has an effective viewing angle from about −63.4 degrees to about 67.2 degrees in the horizontal direction, as shown in FIG. 6d.

Therefore, from FIGS. 6a to 6d, it can be seen that, when a bias voltage is applied to the first electrode 104, the LCD 1 can switch from a narrow viewing angle to a wide viewing angle. When the initial second pretilt angle $\theta_2$ is at 30° and the first electrode 104 is applied with a bias voltage of −2V to −5V, the LCD 1 can achieve a desirable wide viewing angle. When the initial second pretilt angle $\theta_2$ is at 30° and the applied bias voltage is −3V, the LCD 1 can achieve a largest viewing angle.

Figure 7A:
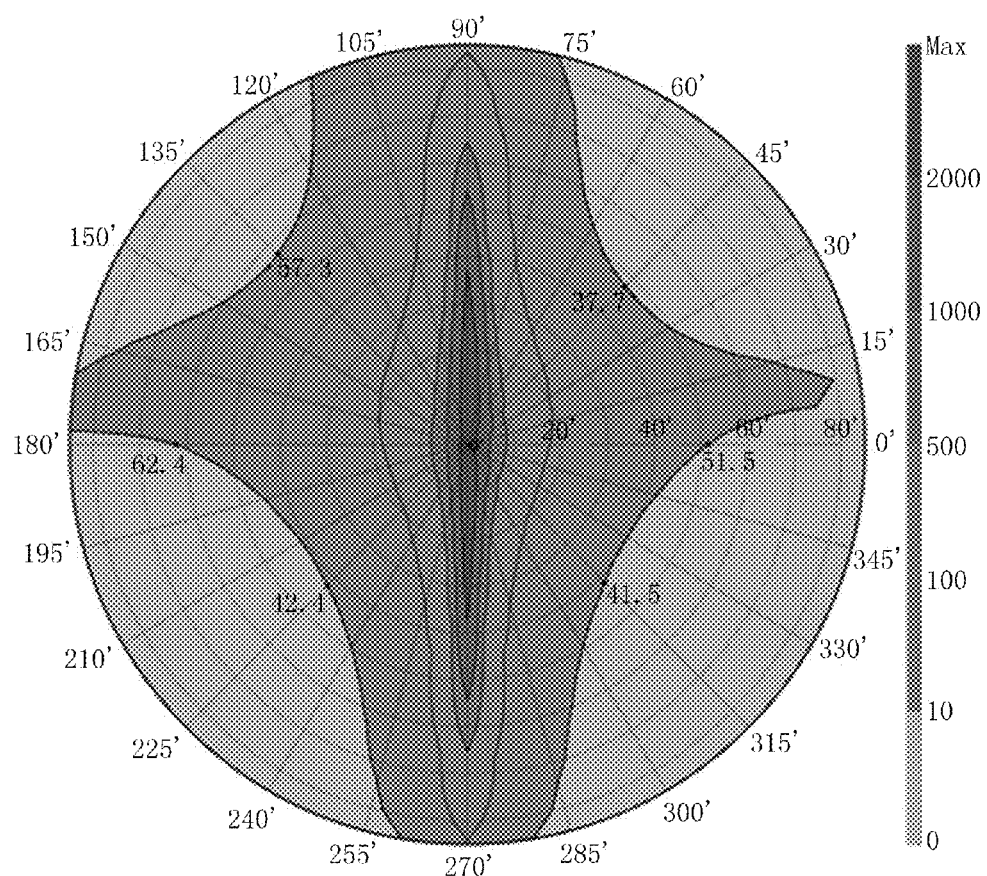
FIGS. 7a-7d show various viewing angle simulation results of the LCD of FIG. 1 when the second pretilt angle $\theta_2$ is at 40°.
Figure 7B:
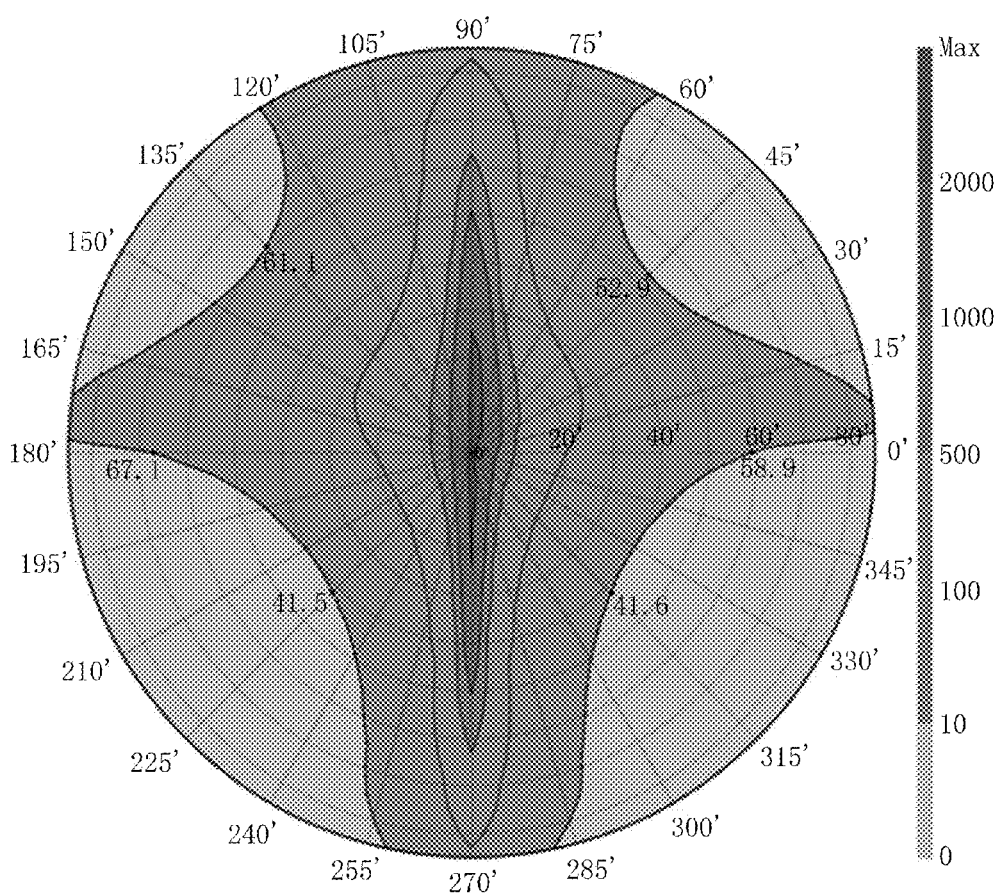
Figure 7C:
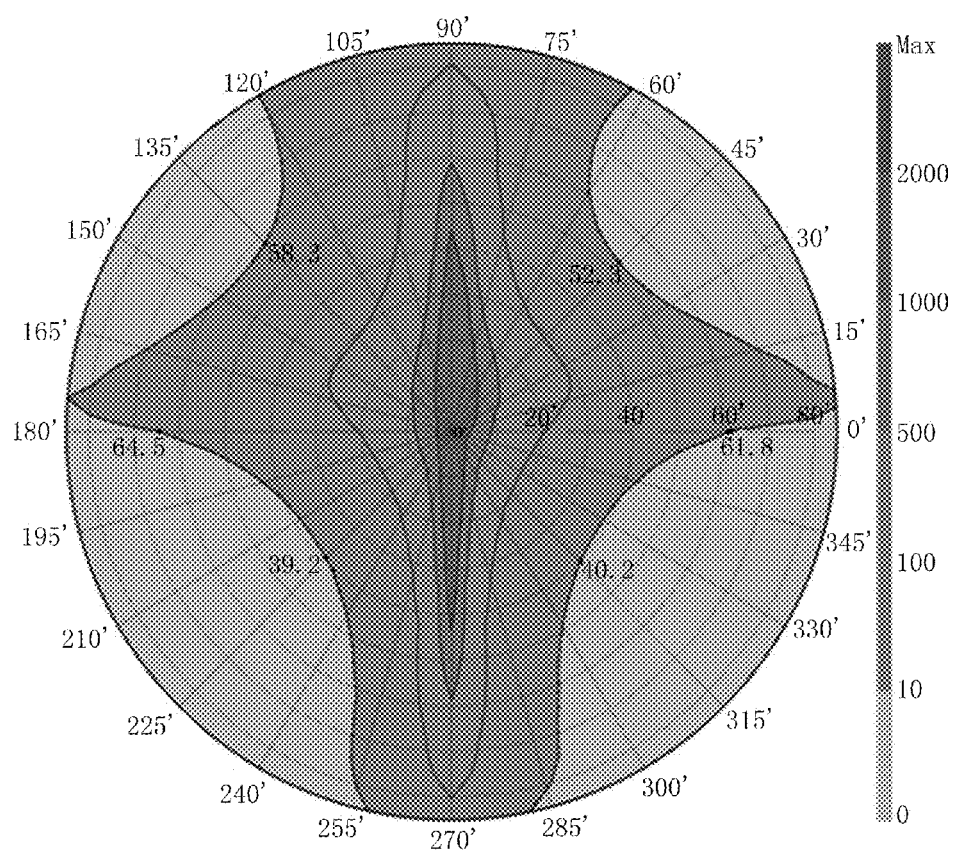
Figure 7D:
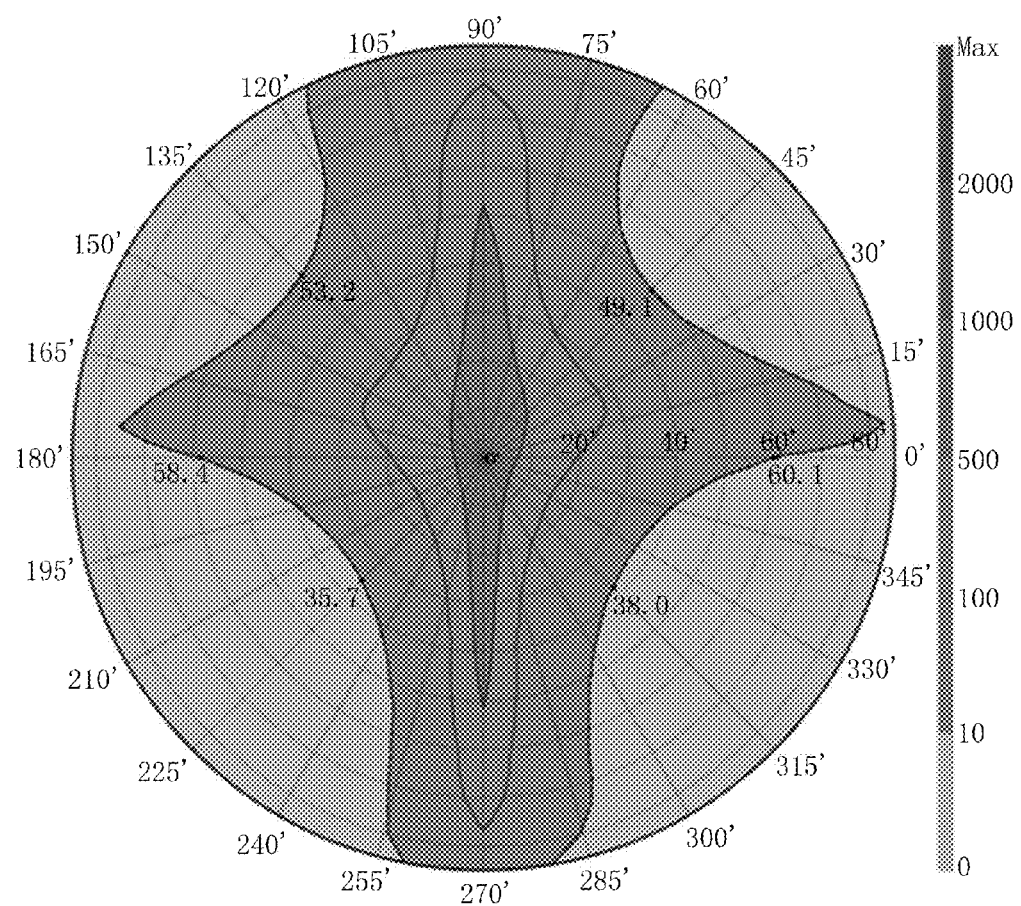

FIGS. 7a-7d show various viewing angle simulation results of the LCD 1 when the initial second pretilt angle $\theta_2$ is at 40°. In FIGS. 7a-7d, different bias voltages are applied to the first electrode 104. When the first electrode 104 is provided with different bias voltages, the effective viewing angles of the LCD 1 as viewed from the horizontal direction are different. For example, when a bias voltage of −2V is applied to the first electrode 104, the LCD 1 has an effective viewing angle from about −62.4 degrees to about 51.5 degrees in the horizontal direction, as shown in FIG. 7a; when a bias voltage of −3V is applied to the first electrode 104, the LCD 1 has an effective viewing angle from about −67.1 degrees to about 58.9 degrees in the horizontal direction, as shown in FIG. 7b; when a bias voltage of −4V is applied to the first electrode 104, the LCD 1 has an effective viewing angle from about −64.5 degrees to about 61.8 degrees in the horizontal direction, as shown in FIG. 7c; and when a bias voltage of −5V is applied to the first electrode 104, LCD 1 has an effective viewing angle from about −58.4 degrees to about 60 degrees in the horizontal direction, as shown in FIG. 7d.

From FIGS. 7a to 7d, it can be seen that, when the initial second pretilt angle $\theta_2$ is at 40° and the first electrode 104 is applied with a bias voltage of −2V to −5V, the LCD 1 can achieve a desirable wide viewing angle. When the initial second pretilt angle $\theta_2$ is at 40° and the applied bias voltage is −3V, the LCD 1 can achieve a largest viewing angle.

Figure 8A:
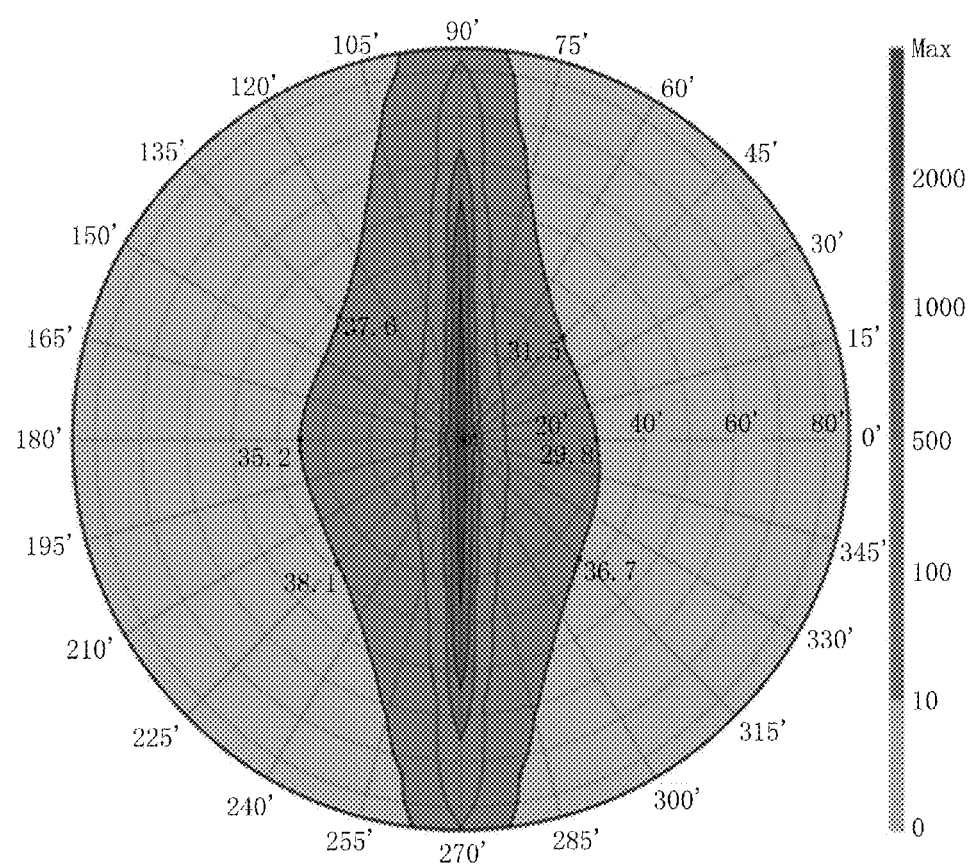
FIGS. 8a-8f show various viewing angle simulation results of the LCD of FIG. 1 when the second pretilt angle $\theta_2$ is at 50°.
Figure 8B:
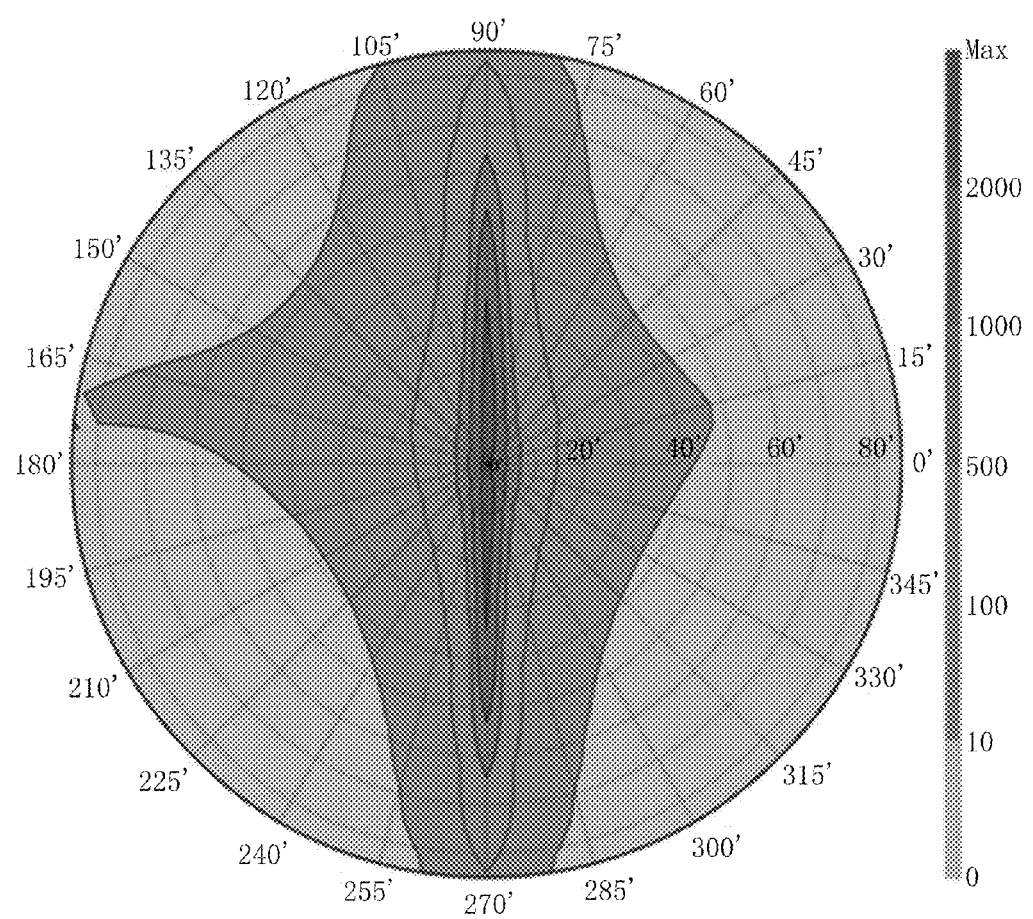
Figure 8C:
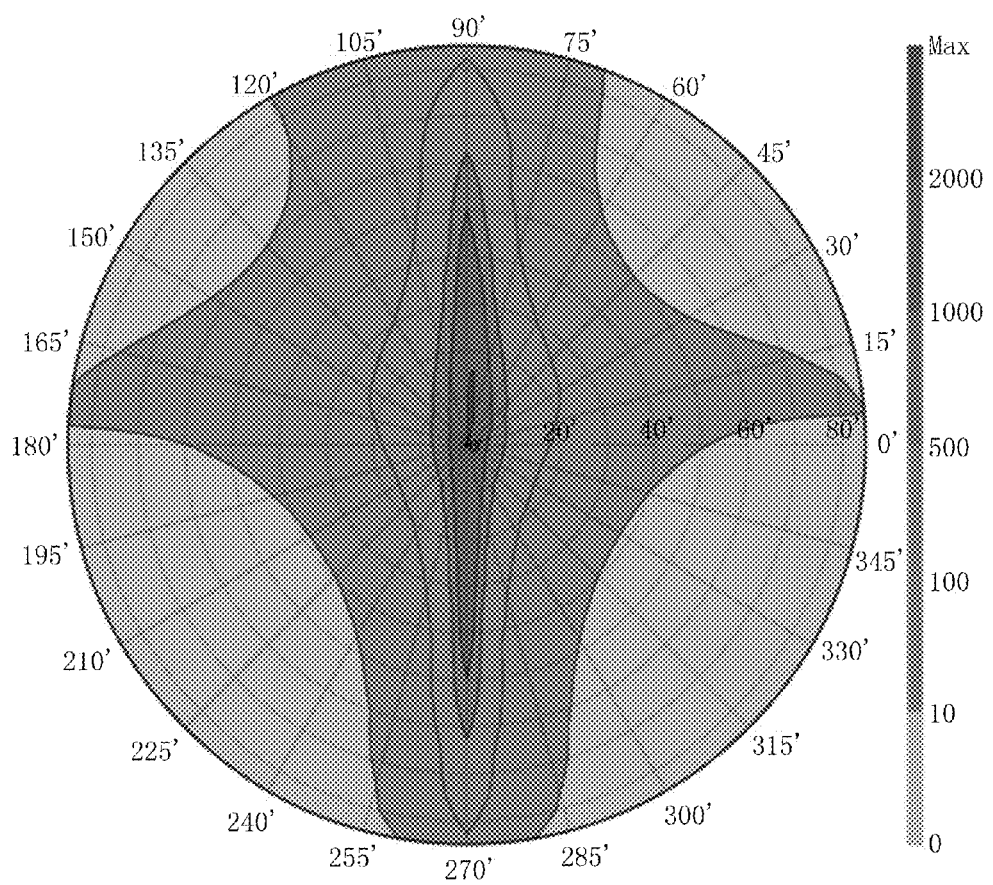
Figure 8D:
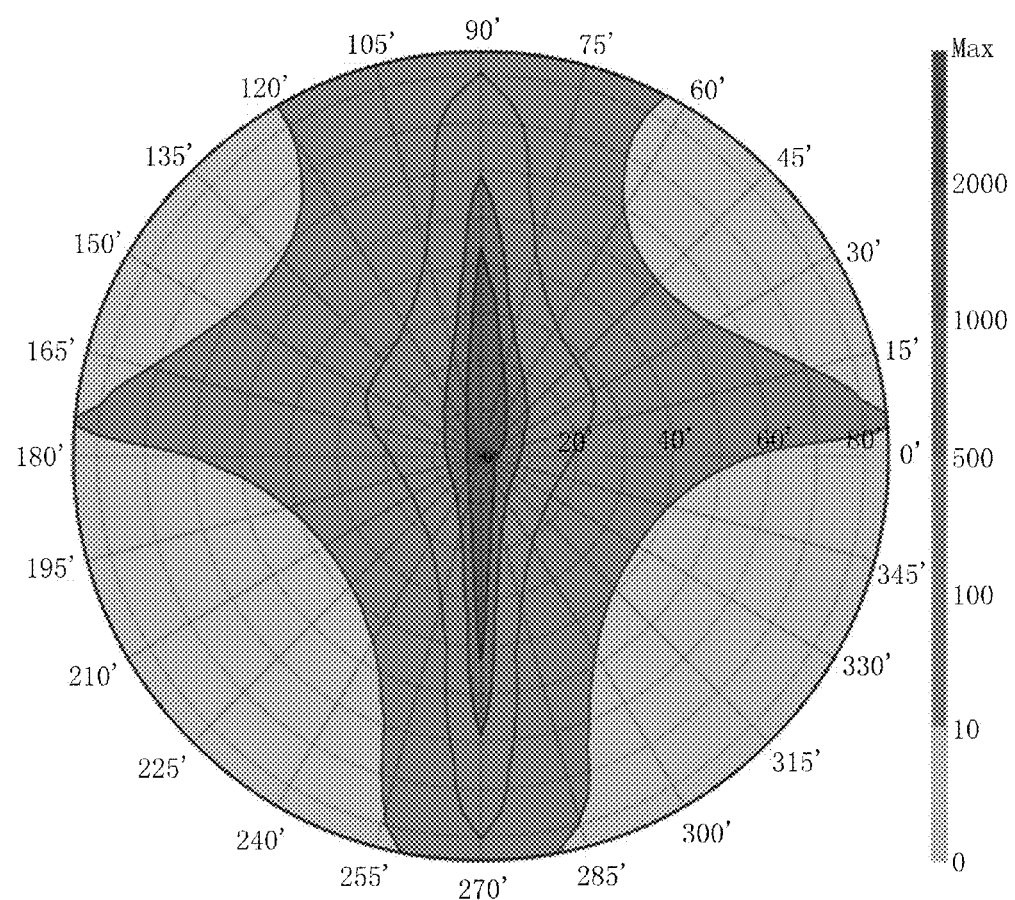
Figure 8E:
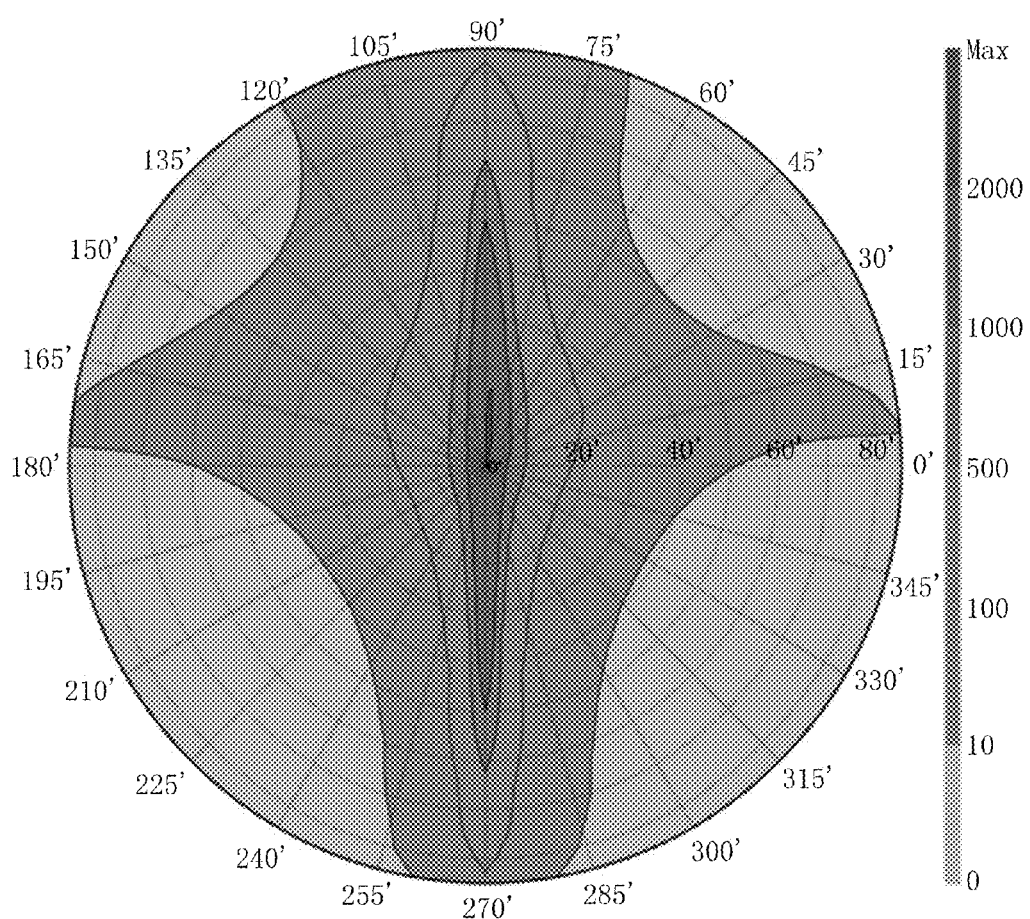
Figure 8F:
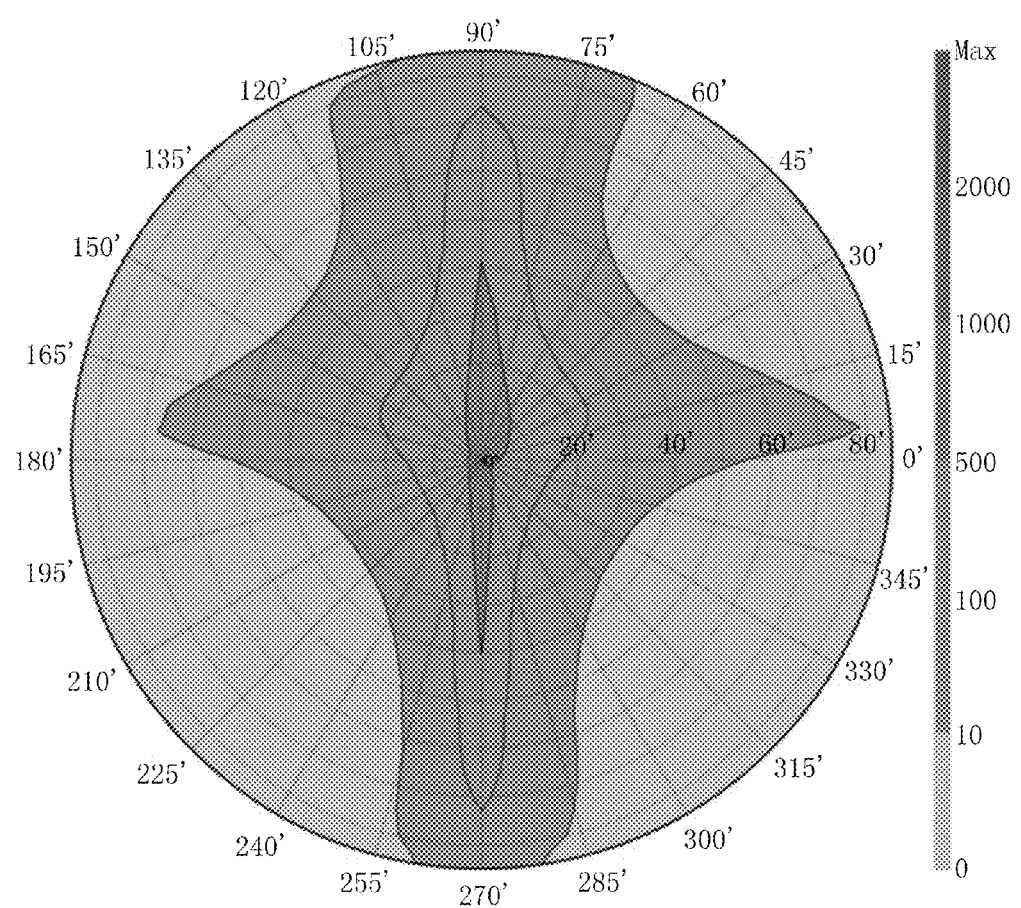

FIGS. 8a-8f show various viewing angle simulation results of the LCD 1 when the initial second pretilt angle $\theta_2$ is at 50°. In FIGS. 8a-8f, different bias voltages are applied to the first electrode 104. When the first electrode 104 is provided with different bias voltages, the effective viewing angles of the LCD 1 as viewed from the horizontal direction are different. For example, when a bias voltage of −1V is applied to the first electrode 104, the LCD 1 has an effective viewing angle from about −35.2 degrees to about 29.8 degrees in the horizontal direction, as shown in FIG. 8a; when a bias voltage of −2V is applied to the first electrode 104, the LCD 1 has an effective viewing angle from about −50 degrees to about 40 degrees in the horizontal direction, as shown in FIG. 8b; when a bias voltage of −3V is applied to the first electrode 104, the LCD 1 has an effective viewing angle from about −55 degrees to about 50 degrees in the horizontal direction, as shown in FIG. 8c; when a bias voltage of −4V is applied to the first electrode 104, the LCD 1 has an effective viewing angle from about −60 degrees to about 55 degrees in the horizontal direction, as shown in FIG. 8d; when a bias voltage of −5V is applied to the first electrode 104, LCD 1 has an effective viewing angle from about −55 degrees to about 55 degrees in the horizontal direction, as shown in FIG. 8e; and when a bias voltage of −6V is applied to the first electrode 104, LCD 1 has an effective viewing angle from about −50 degrees to about 50 degrees in the horizontal direction, as shown in FIG. 8f.

From FIGS. 8a to 8f, it can be seen that, when the initial second pretilt angle $\theta_2$ is at 50° and the first electrode 104 is applied with a bias voltage of −2V to −6V, the LCD 1 can achieve a desirable wide viewing angle. When the initial second pretilt angle $\theta_2$ is at 50° and the applied bias voltage is −4V, the LCD 1 can achieve a largest viewing angle.

Figure 9:
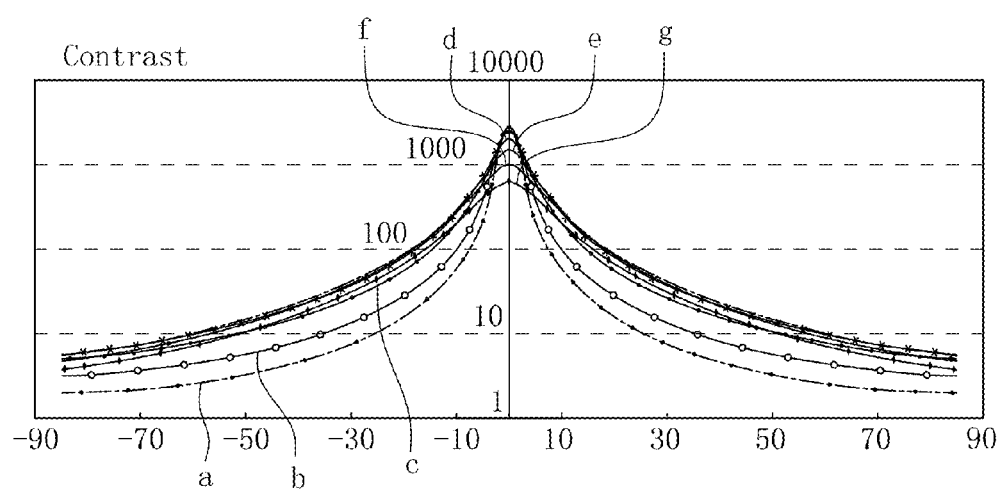
FIG. 9 is a graph showing the contrast of the LCD of FIG. 1 in the horizontal direction when the second pretilt angle $\theta_2$ is at 50°.

FIG. 9 is a graph showing the contrast of the present LCD 1 in the horizontal direction when the initial second pretilt angle $\theta_2$ is at 50°. The curve a denotes the contrast of the present LCD 1 in the horizontal direction when no bias voltage is applied to the first electrode 104, the curve b denotes the contrast of the present LCD 1 in the horizontal direction when a bias voltage of −1V is applied to the first electrode 104, the curve c denotes the contrast of the present LCD 1 in the horizontal direction when a bias voltage of −2V is applied to the first electrode 104, the curve d denotes the contrast of the present LCD 1 in the horizontal direction when a bias voltage of −3V is applied to the first electrode 104, the curve e denotes the contrast of the present LCD 1 in the horizontal direction when a bias voltage of −4V is applied to the first electrode 104, the curve f denotes the contrast of the present LCD 1 in the horizontal direction when a bias voltage of −5V is applied to the first electrode 104, and the curve g denotes the contrast of the present LCD 1 in the horizontal direction when a bias voltage of −6V is applied to the first electrode 104. From FIG. 9, it can be seen that, when the contrast is greater than 10 and the applied bias voltage is −4V, the contrast of the present LCD 1 changes most slowly as the viewing angle in the horizontal direction increases.

Figure 10A:
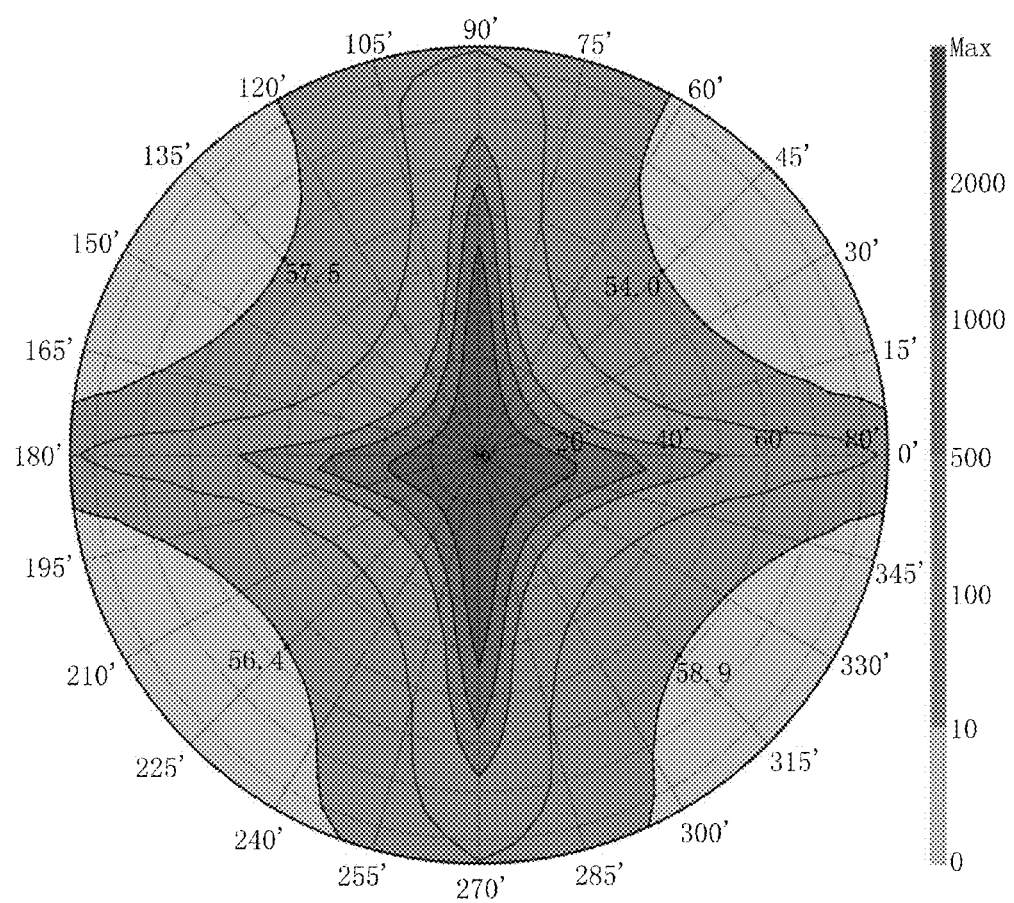
FIG. 10a shows the viewing angle simulation result of a conventional FFS type LCD.
Figure 10B:
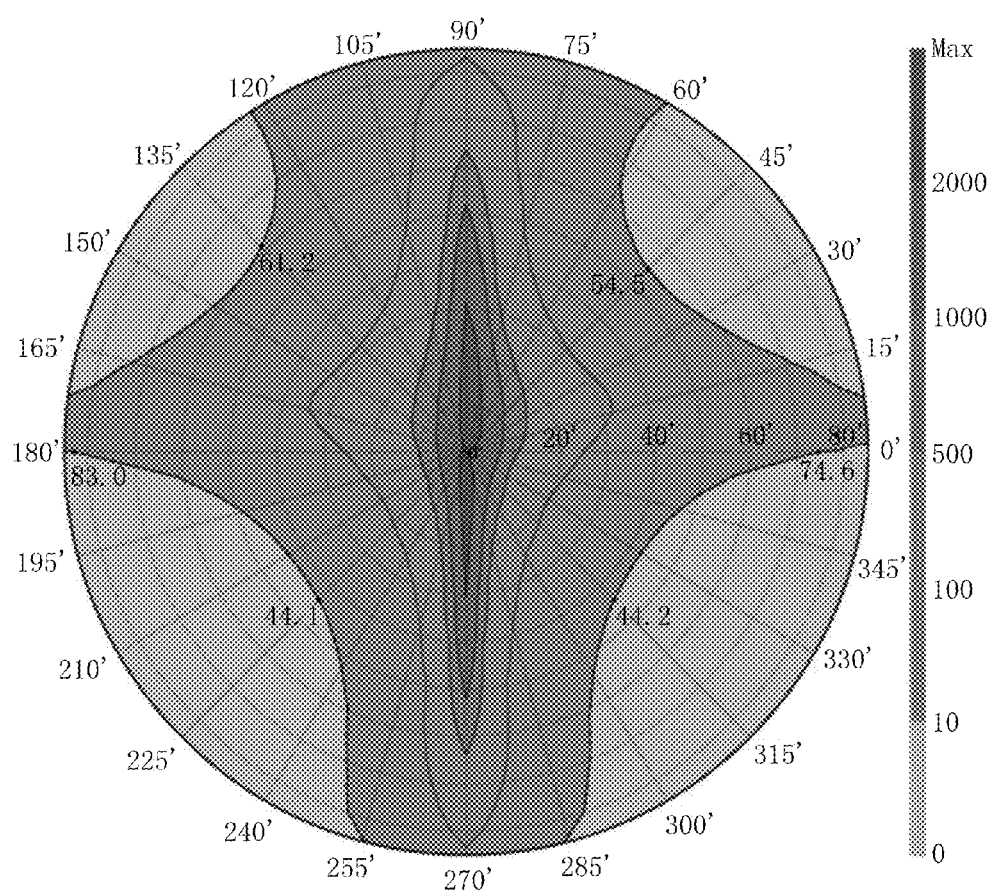
FIG. 10b shows the viewing angle simulation result of the LCD of FIG. 1 when the second pretilt angle $\theta_2$ is at 30° and the applied bias voltage is −3V.

FIG. 10a shows the viewing angle simulation result of a conventional FFS type LCD in which the liquid crystal molecules adjacent to the alignment films 106, 210 are not tilted and arranged substantially in parallel to the alignment films 106, 210. FIG. 10b shows the viewing angle simulation result of the present LCD 1 when the initial second pretilt angle $\theta_2$ is at 30° and the applied bias voltage is −3V. As can be seen from FIGS. 10a-10b, when the initial second pretilt angle $\theta_2$ is at 30° and the bias voltage applied to the first electrode 104 is −3V, the viewing angle is in the range from about −83 degrees to about 74.6 degrees in the horizontal direction, the viewing angle is in the range from about −85 degrees to about 85 degrees in the vertical direction. The viewing angle of the present LCD 1 in the horizontal direction is slightly lower than the viewing angle of the conventional FFS type LCD in the horizontal direction, such that the present LCD 1 can almost achieve the same display effect as the conventional FFS type LCD.

Figure 11A:
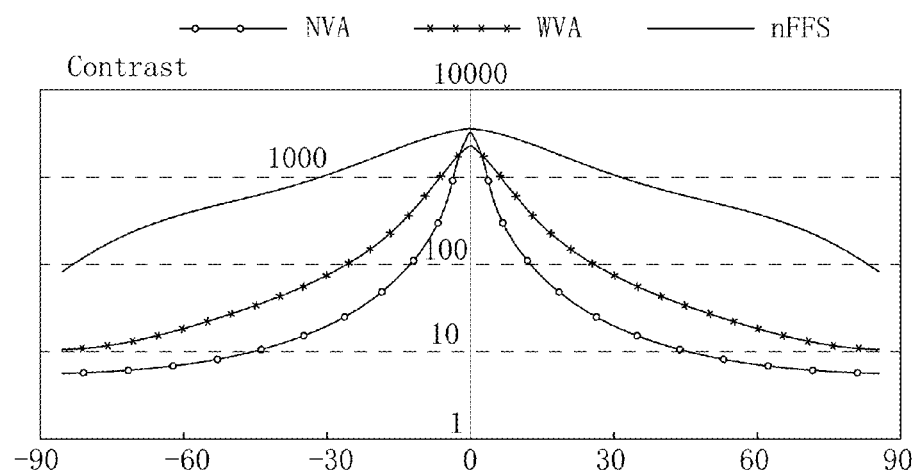
FIG. 11a is a graph showing the contrast of the present LCD 1 and a conventional FFS type LCD in the horizontal direction.

FIG. 11a is a graph showing the contrast of the present LCD 1 and a conventional FFS type LCD in the horizontal direction. In FIG. 11a, it is assumed that the present LCD 1 has an initial second pretilt angle $\theta_2$ of 30°. The curve NVA denotes the contrast of the present LCD 1 with a narrow viewing angle (no bias voltage is applied to the first electrode 104), the curve WVA denotes the contrast of the present LCD 1 with a wide viewing angle (the bias voltage applied to the first electrode 104 is −3V), and the curve nFFS denotes the contrast of a conventional FFS type LCD with negative liquid crystal molecules. As shown in FIG. 11a, in the horizontal direction, the contrast of the present LCD 1 and the contrast of the conventional FFS type LCD are both decreased as the viewing angle increases, and the contrast of the present LCD 1 drops more rapidly as compared with the contrast of the conventional FFS type LCD. In addition, it can be seen from FIG. 8a that the contrast of the present LCD 1 and the contrast of the conventional FFS type LCD are in a comparable level.

Figure 11B:
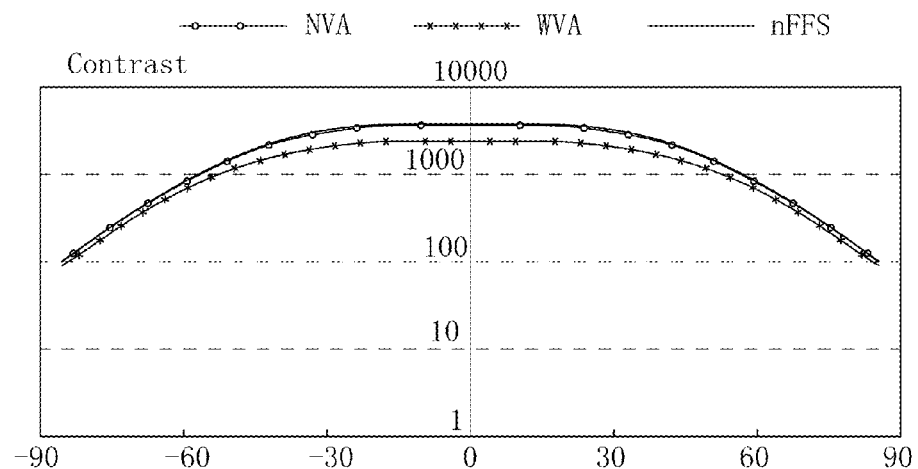
FIG. 11b is a graph showing the contrast of the present LCD 1 and a conventional FFS type LCD in the vertical direction.

FIG. 11b is a graph showing the contrast of the present LCD 1 and a conventional FFS type LCD in the vertical direction. In FIG. 11b, it is assumed that the present LCD 1 has an initial second pretilt angle $\theta_2$ of 30°. The curve NVA denotes the contrast of the present LCD 1 with a narrow viewing angle (no bias voltage is applied to the first electrode 104), the curve WVA denotes the contrast of the present LCD 1 with a wide viewing angle (the bias voltage applied to the first electrode 104 is −3V), and the curve nFFS denotes the contrast of a conventional FFS type LCD with negative liquid crystal molecules. As shown in FIG. 11b, in the vertical direction, the contrast of the present LCD 1 and the contrast of the conventional FFS type LCD are both decreased as the viewing angle increases, and the contrast of the present LCD 1 drops at almost the same speed when compared with the contrast of the conventional FFS type LCD. In addition, it can be seen from FIG. 11b that the contrast of the present LCD 1 and the contrast of the conventional FFS type LCD are in a comparable level.

Figure 12A:
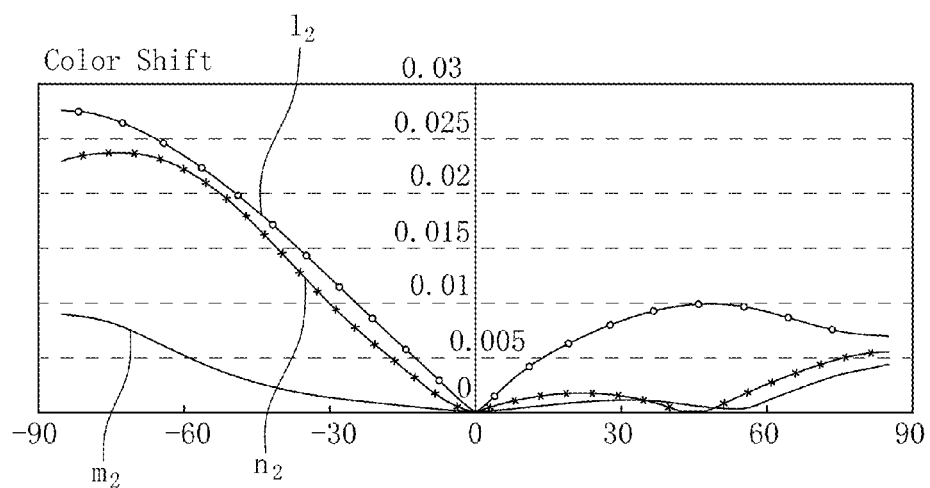
FIG. 12a is a graph showing the color shift of the present LCD 1 and a conventional FFS type LCD in the horizontal direction.

FIG. 12a is a graph showing the color shift of the present LCD 1 and a conventional FFS type LCD in the horizontal direction. In FIG. 12a, it is assumed that the present LCD 1 has an initial second pretilt angle $\theta_2$ of 30°. The curve m2 denotes the color shift of a conventional FFS type LCD with negative liquid crystal molecules, the curve n2 denotes the color shift of the present LCD 1 with a wide viewing angle (the bias voltage applied to the first electrode 104 is −3V), and the curve l2 denotes the color shift of the present LCD 1 with a narrow viewing angle (no bias voltage is applied to the first electrode 104). As shown in FIG. 12a, in the horizontal direction, the present LCD 1 in the narrow viewing angle has the most serious color shift, and the conventional FFS type LCD has the minimal color shift.

Figure 12B:
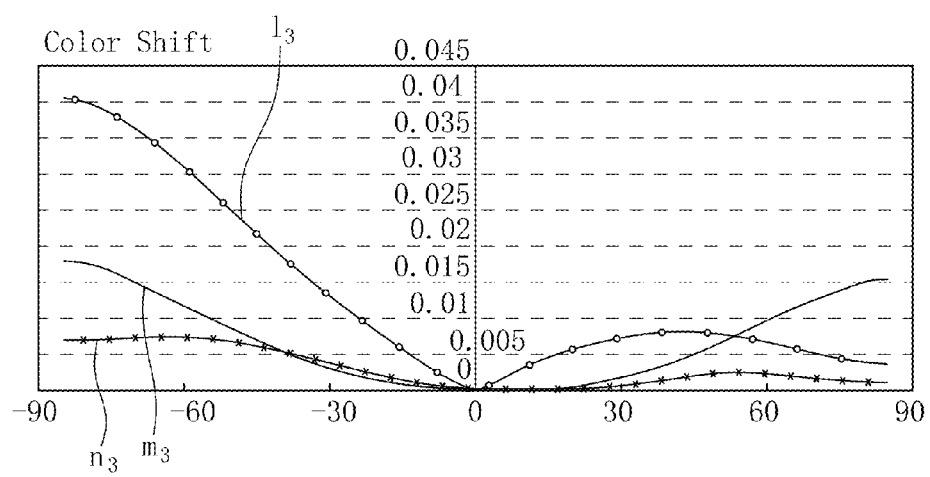
FIG. 12b is a graph showing the color shift of the present LCD 1 and a conventional FFS type LCD in the vertical direction.

FIG. 12b is a graph showing the color shift of the present LCD 1 and a conventional FFS type LCD in the vertical direction. In FIG. 12b, it is assumed that the present LCD 1 has an initial second pretilt angle $\theta_2$ of 30°. The curve m3 denotes the color shift of a conventional FFS type LCD with negative liquid crystal molecules, the curve n3 denotes the color shift of the present LCD 1 with a wide viewing angle (the bias voltage applied to the first electrode 104 is −3V), and the curve l3 denotes the color shift of the present LCD 1 with a narrow viewing angle (no bias voltage is applied to the first electrode 104). As shown in FIG. 12b, in the vertical direction, the present LCD 1 in the wide viewing angle has a color shift lower than the conventional FFS type LCD.

In the following table, the initial second pretilt angle $\theta_2$ of the present LCD 1 is at 30°, NVA denotes the narrow viewing angle display mode of the present LCD 1, WVA denotes the wide viewing angle display mode of the present LCD 1 (a bias voltage of −3V is applied to the first electrode 104), and nFFS denotes a conventional FFS type LCD displayed with negative liquid crystal molecules. It can be seen from the table, the response time ($T_{total}$) of the present LCD 1 in the narrow viewing angle display mode is almost the same as the response time ($T_{total}$) of the conventional FFS type LCD, and the response time ($T_{total}$) of the present LCD 1 in the wide viewing angle display mode is about 7.65 ms greater than the response time ($T_{total}$) of the conventional FFS type LCD. The transmittance (Tr) of the present LCD 1 in the narrow viewing angle display mode is almost the same with the transmittance (Tr) of the conventional FFS type LCD, and the transmittance (Tr) of the present LCD 1 in the wide viewing angle display mode is slightly lower than the transmittance (Tr) of the conventional FFS type LCD.

|  | NVA | WVA (bias voltage of −3 v) | nFFS |
|---|---|---|---|
| $T_{on}$ (ms) | 21.1687 | 25.321 | 16.52 |
| $T_{off}$ (ms) | 27.4441 | 30.087 | 31.232 |
| $T_{total}$ (ms) | 48.6128 | 55.408 | 47.754 |
| transmittance (Tr) | 13.86% | 11.07% | 14.12% |

Figure 13:
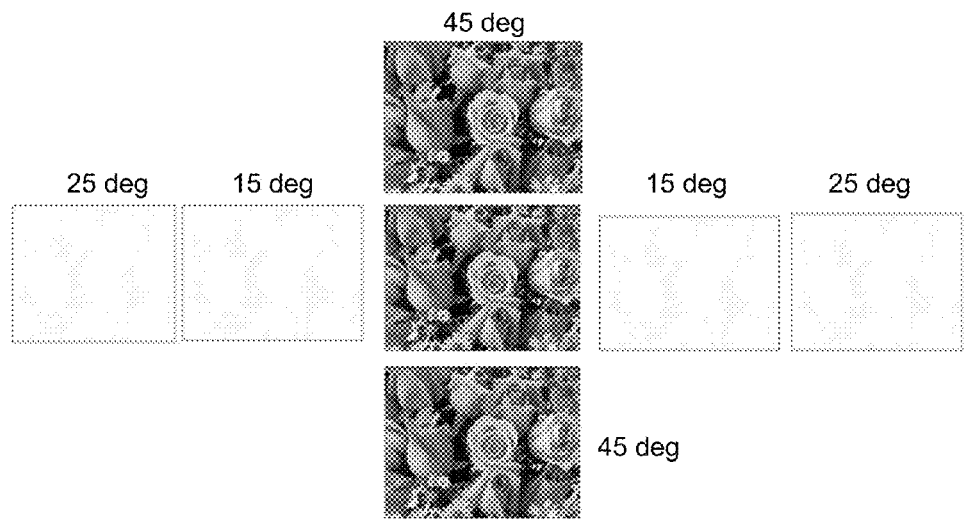
FIG. 13 shows the display effect of the LCD of FIG. 1 in the narrow viewing angle display mode.

FIG. 13 shows the display effect of the present LCD 1 in the narrow viewing angle display mode. In FIG. 13, the initial second pretilt angle $\theta_2$ is at 40°, and no bias voltage is applied to the first electrode 104. It can be seen from FIG. 13, at least in the horizontal direction, the display effect when viewed from a viewing angle of greater than 25 degrees is poor compared with the display effect when viewed from the front of the screen. Thus, the present LCD 1 can satisfy the demand for protecting privacy in public places when the present LCD 1 is displayed in the narrow viewing angle display mode.

Figure 14:
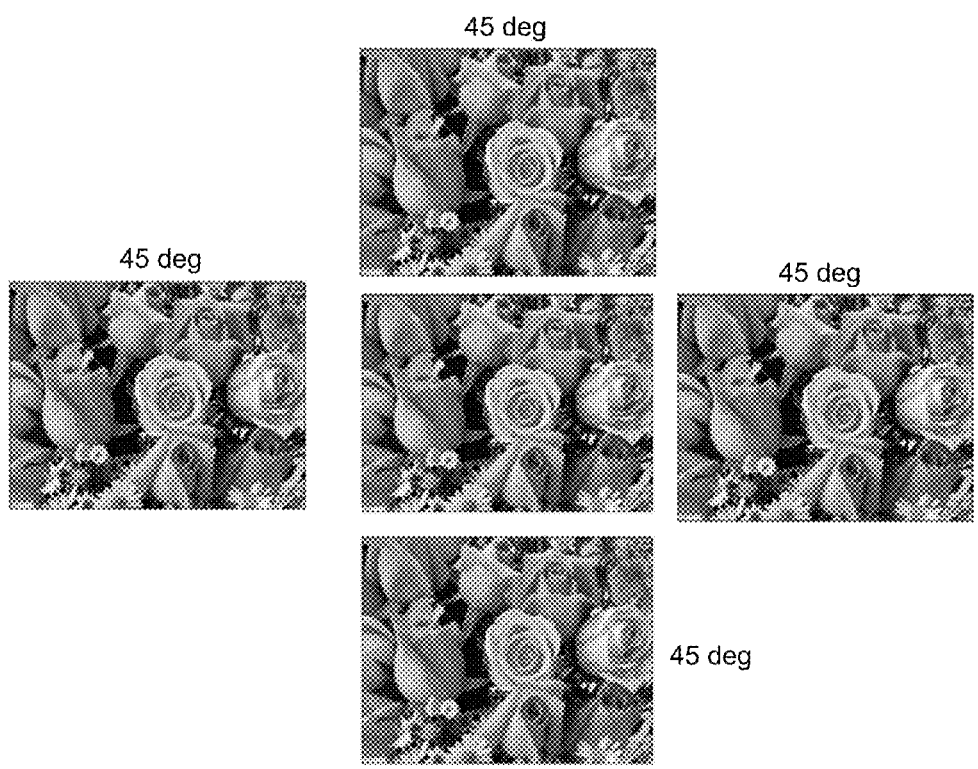
FIG. 14 shows the display effect of the LCD of FIG. 1 in the wide viewing angle display mode.

FIG. 14 shows the display effect of the present LCD 1 in the wide viewing angle display mode. In FIG. 14, the initial second pretilt angle $\theta_2$ is at 40°, and a bias voltage of −4V is applied to the first electrode 104. It can be seen from FIG. 14, both in the horizontal direction and in the vertical direction, the display effect when viewed from a viewing angle of 45 degrees is comparable with the display effect when viewed from the front of the screen. Thus, the present LCD 1 can achieve a relatively large viewing angle when the present LCD 1 is displayed in the wide viewing angle display mode. The present LCD 1 can switch from the narrow viewing angle display mode to the wide viewing angle display mode by applying a bias voltage to the first electrode 104 of the first substrate 10.

From the above, in the present LCD 1, the liquid crystal molecules 301 adjacent to the first alignment film 106 are tilted at a first pretilt angle $\theta_1$, and the liquid crystal molecules 301 adjacent to the second alignment film 210 are tilted at a second pretilt angle $\theta_2$, wherein the second pretilt angle $\theta_2$ is much greater than the first pretilt angle $\theta_1$. By applying a bias voltage to the first electrode 104 or not, the rotation of the liquid crystal molecules 301 of the liquid crystal layer 30 can be controlled, and accordingly the present LCD 1 can switch between a narrow viewing angle and a wide viewing angle.

When no bias voltage is applied to the first electrode 104, lights passing the liquid crystal molecules 301 are not matched with the light transmission axis of the first polarizer 102 and the second polarizer 202, a light leakage phenomenon in dark state is resulted and the contrast of displayed images of the present LCD 1 is decreased, to thereby achieve a narrow viewing angle display mode.

When a bias voltage is applied to the first electrode 104, a vertical electric field is generated between the first substrate 10 and the second substrate 20 to cause the liquid crystal molecules 301 of the liquid crystal layer 30 to rotate. As the liquid crystal molecules 301 rotate, the tilt angle of the liquid crystal molecules 301 adjacent to the second alignment film 210 is gradually reduced from the initial second pretilt angle $\theta_2$. Particularly, when a relatively large bias voltage is applied to the first electrode 104, the tilt angle of the liquid crystal molecules 301 adjacent to the second alignment film 210 may reduce from the initial second pretilt angle $\theta_2$ to nearly zero in which case the liquid crystal molecules 301 adjacent to the second alignment film 210 are substantially parallel to the second substrate 20, the light leakage phenomenon in dark state is relieved, the contrast of images of the present LCD 1 is accordingly increased, to thereby achieve a wide viewing angle display mode.

Accordingly, in another aspect, a method of controlling a viewing angle of the LCD 1 is provided. The method includes the steps: when the LCD 1 is required to display with a narrow viewing angle, applying no bias voltage to the first electrode 104; and when the LCD 1 is required to display with a wide viewing angle, applying a bias voltage to the first electrode 104. Preferably, the second pretilt angle $\theta_2$ is in the range of 30° to 50°, the first pretilt angle $\theta_1$ is in the range of 0° to 5°, and the bias voltage applied to the first electrode 104 is in the range of −2V to −6V.

Therefore, the present LCD 1 can easily achieve a narrow viewing angle and a wide viewing angle by controlling the bias voltage applied to the first electrode 104 of the first substrate 10, and the present LCD 1 can be switched between a narrow viewing angle and a wide viewing angle according to requirements. It is not required to use a louver shielding film or to provide a dual light source backlight system in the LCD, without increasing the thickness and the cost of the LCD and having the advantages of easy operation and good flexibility.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An LCD (liquid crystal display) with switchable viewing angle, comprising:
    a first substrate being provided with a first electrode and a first alignment film thereon;
    a second substrate being provided with a second electrode, a third electrode and a second alignment film thereon, wherein one of the second electrode and the third electrode is a common electrode, and the other one of the second electrode and the third electrode is a pixel electrode;
    a liquid crystal layer being disposed between the first alignment film and the second alignment film, the liquid crystal layer comprising a plurality of liquid crystal molecules, wherein the liquid crystal molecules are negative liquid crystal molecules, the liquid crystal molecules adjacent to the first alignment film are tilted at a first pretilt angle, the liquid crystal molecules adjacent to the second alignment film are tilted at a second pretilt angle, the second pretilt angle is in the range of 30° to 50°, and the first pretilt angle is in the range of 0° to 5°;
    wherein when no bias voltage is applied to the first electrode, the LCD is displayed with a narrow viewing angle; and when a bias voltage is applied to the first electrode to generate a vertical electric field between the first substrate and the second substrate, the LCD is displayed with a wide viewing angle.

2. The LCD according to claim 1, wherein the liquid crystal molecules adjacent to the first alignment film are substantially parallel to the first alignment film.

3. The LCD according to claim 1, wherein when the LCD is displayed with a wide viewing angle, the bias voltage applied to the first electrode is in the range of −2V to −6V.

4. The LCD according to claim 1, wherein all of the liquid crystal molecules in the liquid crystal layer are tilted in a counter-clockwise direction.

5. The LCD according to claim 1, wherein the first alignment film is rubbed to have a first rubbing direction, the second alignment film is rubbed to have a second rubbing direction, the liquid crystal molecules adjacent to the first alignment film are arranged and oriented along the first rubbing direction of the first alignment film at a tilted state with the first pretilt angle, the liquid crystal molecules adjacent to the second alignment film are arranged and oriented along the second rubbing direction of the second alignment film at a tilted state with the second pretilt angle.

6. The LCD according to claim 1, wherein the polarity of the bias voltage applied to the first electrode is contrary to the polarity of the common voltage provided to the common electrode.

7. The LCD according to claim 1, wherein the second electrode is a pixel electrode, and the third electrode is a common electrode.

8. The LCD according to claim 1, wherein the third electrode is a pixel electrode, and the second electrode is a common electrode.

9. The LCD according to claim 1, wherein the first electrode is a surface electrode without being patterned.

10. The LCD according to claim 1, wherein at least one of the second electrode and the third electrode is patterned to form a plurality of electrode stripes which are arranged in parallel to each other.

11. The LCD according to claim 1, wherein the first substrate further comprises a first transparent base, the first electrode is arranged on a surface of the first transparent base facing the liquid crystal layer, the first alignment film is arranged on a surface of the first electrode facing the liquid crystal layer.

12. The LCD according to claim 1, wherein the second substrate further comprises a second transparent base and an insulating layer, the second electrode is arranged on a surface of the second transparent base facing the liquid crystal layer, the insulating layer is arranged on a surface of the second electrode facing the liquid crystal layer, the third electrode is arranged on a surface of the insulating layer facing the liquid crystal layer, the second alignment film is arranged on a surface of the third electrode facing the liquid crystal layer.

13. A method of controlling a viewing angle of the LCD of claim 1, comprising the steps:
when the LCD is required to display with a narrow viewing angle, applying no bias voltage to the first electrode;
when the LCD is required to display with a wide viewing angle, applying a bias voltage to the first electrode.

14. The method according to claim 13, wherein the bias voltage applied to the first electrode is in the range of −2V to −6V.

* * * * *